(12) United States Patent
Binfet et al.

(10) Patent No.: US 12,007,912 B2
(45) Date of Patent: Jun. 11, 2024

(54) NAND PAGE BUFFER BASED SECURITY OPERATIONS

(71) Applicant: Micron Technology, Inc., Boise, ID (US)

(72) Inventors: Jeremy Binfet, Boise, ID (US); Lance Walker Dover, Fair Oaks, CA (US); Tommaso Vali, Sezze (IT); Walter Di Francesco, Avezzano (IT)

(73) Assignee: Micron Technology, Inc., Boise, ID (US)

( * ) Notice: Subject to any disclaimer, the term of this patent is extended or adjusted under 35 U.S.C. 154(b) by 91 days.

(21) Appl. No.: 17/814,395

(22) Filed: Jul. 22, 2022

(65) Prior Publication Data
US 2023/0393994 A1 Dec. 7, 2023

Related U.S. Application Data

(60) Provisional application No. 63/365,675, filed on Jun. 1, 2022.

(51) Int. Cl.
*G06F 12/14* (2006.01)
*G11C 16/04* (2006.01)
*G11C 16/22* (2006.01)

(52) U.S. Cl.
CPC .......... *G06F 12/1466* (2013.01); *G11C 16/22* (2013.01); *G06F 2212/1052* (2013.01); *G11C 16/0483* (2013.01)

(58) Field of Classification Search
None
See application file for complete search history.

(56) References Cited

U.S. PATENT DOCUMENTS

| | | | | |
|---|---|---|---|---|
| 2014/0126306 A1* | 5/2014 | Otterstedt | ............ | H04L 9/3263 |
| | | | | 365/189.07 |
| 2019/0371413 A1* | 12/2019 | Okabe | .................... | G11C 16/24 |
| 2020/0013438 A1* | 1/2020 | Hsu | ........................ | G11C 7/106 |
| 2020/0119931 A1* | 4/2020 | Lu | .......................... | G11C 11/412 |
| 2020/0233967 A1* | 7/2020 | Mondello | ............. | H04L 9/3242 |
| 2023/0154525 A1* | 5/2023 | Kim | ........................ | G11C 16/22 |
| | | | | 365/185.04 |

OTHER PUBLICATIONS

Brown et al. Fundamentals of Digital Logic Design with Verilog Design. 2003. McGraw-Hill. pp. 350-368.*
Gao et al. "Physical unclonable functions." Feb. 2020. Nature Electronics. Vol. 3. Pp 81-91.*

* cited by examiner

*Primary Examiner* — Nathan Sadler
(74) *Attorney, Agent, or Firm* — Harrity & Harrity, LLP

(57) ABSTRACT

In some implementations, a memory device may resolve a set of latches of a NAND page buffer to a set of initialized values. The memory device may obtain a NAND page buffer initialized data set from the set of initialized values of the set of latches. The memory device may generate a security key using the NAND page buffer initialized data set.

30 Claims, 23 Drawing Sheets

146

146

146

146 →

NAND PAGE BUFFER BASED SECURITY OPERATIONS

CROSS-REFERENCE TO RELATED APPLICATION

This Patent Application claims priority to U.S. Provisional Patent Application No. 63/365,675, filed on Jun. 1, 2022, and entitled "NAND PAGE BUFFER BASED SECURITY OPERATIONS." The disclosure of the prior Application is considered part of and is incorporated by reference into this Patent Application.

TECHNICAL FIELD

The present disclosure generally relates to memory devices and, for example, use of a NAND page buffer for security operations.

BACKGROUND

NAND flash memory, which may also be referred to as a "NAND" or a "NAND device," is a non-volatile type of memory device that uses circuitry similar to or resembling NAND logic gates to enable electrically programming, erasing, and storing of data even when a power source is not supplied. NANDs may be used in various types of electronics devices, such as computers, mobile phones, or automobile computing systems, among other examples.

A NAND device may include an array of flash memory cells, a page buffer, and a column decoder. In addition, the NAND device may include a control logic unit (e.g., a controller), a row decoder, or an address buffer, among other examples. The memory cell array may include memory cell strings connected to bit lines, which are extended in a column direction.

A flash memory cell, which may be referred to as a "cell" or a "data cell," of a NAND device may include a current path formed between a source and a drain on a semiconductor substrate. The flash memory cell may further include a floating gate and a control gate formed between insulating layers on the semiconductor substrate. A programming operation (sometimes called a write operation) of the flash memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the flash memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the flash memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A memory device may include a plurality of page buffers connected between the bit lines and the column decoder. The column decoder is connected between the page buffer and data lines.

DETAILED DESCRIPTION

Figure 1A:
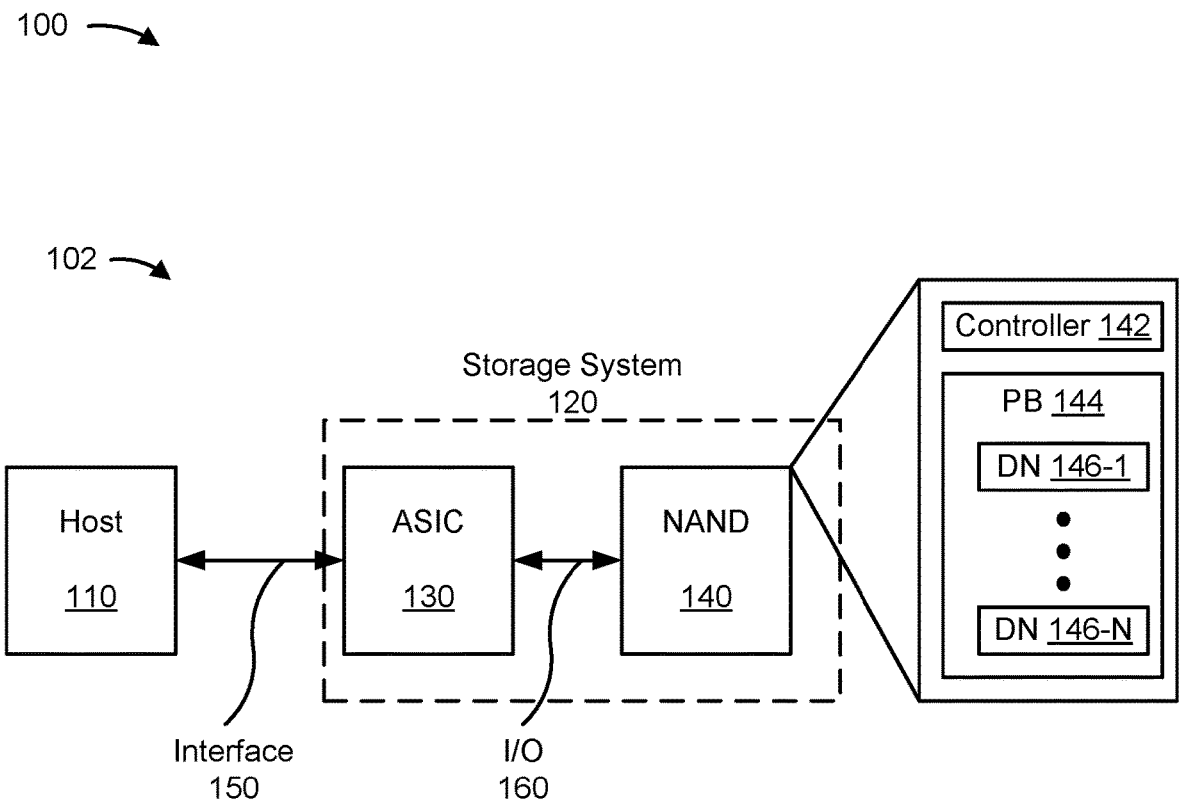
FIGS. 1A-1M are diagrams illustrating an example of using a page buffer as a physical unclonable function (PUF) for security key generation.

Device identification and authentication may be important for security operations in electronics. For example, a computing device may validate that a component connected to the computing device is authentic to prevent access to the computing device by a malicious entity. One technique for uniquely identifying a component is to provide a physical identifier. For example, a physical identifier may be disposed on a component using a masking technique or a laser etching technique. In this case, a computing device may read the physical identifier to verify that an attached component is a genuine component and not from a malicious entity. However, in some cases the physical identifier can be read and cloned to create a malicious duplicate of a genuine component. For example, a malicious entity may use x-ray techniques to read the physical identifier and clone the physical identifier onto a malicious duplicate of a component. In this case, the computing device may incorrectly identify the malicious duplicate as a genuine component based on the malicious duplicate having the unique physical identifier disposed thereon.

To avoid such attacks, some computing devices may use a physical unclonable function (PUF). A physical unclonable function is a physical object or component that provides a unique identifier as an output for a given input and has one or more properties that make the physical unclonable function difficult or impractical to duplicate. A physical unclonable function may receive an electrical input, an optical input, a radio frequency (RF) input, or a magnetic input, among other examples, and a physical structure of the physical unclonable function converts the input into a unique output. As a result, a first physical unclonable function will have a different output than a second physical unclonable function given the same input.

A first physical unclonable function and a second physical unclonable function may differ with regard to one or more structural parameters, which may result in each physical unclonable function having a different output. For example, a magnetic stripe card may have a magnetic media that includes particles of a magnetic material deposited in a random manner during manufacture. As a result, a first magnetic stripe will have a different pattern than a second magnetic stripe. A detector can detect differences in outputs by the first magnetic stripe and the second magnetic stripe based on respective deposition patterns, thereby enabling differentiation. Because the patterns of magnetic particles are created randomly during the deposition process, it is nearly impossible to artificially create a matching magnetic stripe. In other words, even upon inspection of a physical structure of a physical unclonable function, it may be impossible to recreate the exact conditions that result in a given output from a given input, thereby providing the unclonability property for the physical unclonable function.

Some other example types of physical unclonable functions include optical physical unclonable functions, in which scattered light creates unique patterns that can be measured, quantum physical unclonable functions, in which spatial variations in a bandgap can be measured using photoluminescence techniques, and radio frequency physical unclonable functions, in which frequency errors or offsets or I-Q imbalance can be measured.

Another feature of physical unclonable functions that enhances security for computing devices is that a physical unclonable function generally only provides a unique identifier when in operation. For example, a magnetic stripe only provides an output based on the magnetic stripe's unique structure when being used. Similarly, optical physical unclonable functions only provide their unique light patterns when being used. As a result, the transient nature of an output from such physical unclonable functions can reduce an ability to even identify the unique identifier that is to be duplicated. Accordingly, use of a physical unclonable function can deter attacks by malicious entities.

A memory device, such as a NAND memory device, may be provided with a dedicated physical unclonable function, such as a static random access memory (SRAM) physical unclonable function or a ring oscillator physical unclonable function. In the case of a ring oscillator, the memory device may include a relatively large string of inverters, which may have power applied and counter values measured as a unique identifier. However, the ring oscillator physical unclonable function takes up dedicated space on an integrated circuit of the memory device that cannot be repurposed for memory operations.

Similarly, in the case of an SRAM physical unclonable function, an integrated circuit of a memory device may include a region dedicated for providing an SRAM array for use as a dedicated physical unclonable function. In operation, cells of the SRAM array are resolved to a set of initial '1's' or '0's' (termed "initial values"), the pattern of which forms a unique identifier for the memory device that includes the SRAM array. However, the SRAM array cannot be used for memory operations in addition to use as a physical unclonable function. When the SRAM array is resolved to the set of initial values, the pattern is based on structural variations in transistors in the SRAM array. When writing data to a cell of the SRAM array, the cell is forced to flip and direct current flows through the cell, which can cause degradation to transistors of the cell. Over time, the degradation can change the way the cell resolves (e.g., whether the cell resolves to an initial value of '1' or an initial value '0'). Error correction can account for a small amount of change to the pattern of initial values (e.g., some of which may be due to degradation and some of which may be due to the probabilistic nature of how the cell resolves), but over time the degradation can result in the pattern changing by too much for error correction techniques. As a result, over time, the memory device may no longer be able to provide the same unique identifier, using output from the SRAM array, that is expected to be provided, thus rendering the SRAM array unsuitable for security functions.

Accordingly, when an SRAM array is used as a physical unclonable function, the SRAM array is a dedicated physical unclonable function that is not used for memory operations in the memory device. In other words, the memory device includes a dedicated region on an integrated circuit for the SRAM array, and that dedicated region does not contribute to a data capacity of the memory device. With increasing densities of memory devices and increasing miniaturization of memory devices, there may not be available space for a dedicated physical unclonable function. Accordingly, it may be desirable to provide a non-dedicated physical unclonable function that is usable for memory operations of a memory device without the memory operations causing degradation to a physical structure of the non-dedicated physical unclonable function.

Some implementations described herein enable use of a page buffer as a physical unclonable function and/or as an entropy source for a memory device. For example, the page buffer may include a set of latches (e.g., SRAM latches) that can be resolved to a set of initial values, and the set of initial values can be read for use in generating a security key or providing an entropy source (e.g., for seeding a number generator, for a hashing algorithm, and/or for a cryptographic nonce, among other examples). In this case, the page buffer can be used for memory operations without degradation to the page buffer. For example, when performing memory operations using the page buffer, the latches are subject to "read from" operations rather than "write to" operations. Accordingly, the latches are subject to less than a threshold amount of degradation, such that overall degradation to an output of the page buffer physical unclonable function is within a correctable amount using error correction techniques. In this case, a region of the memory device allocated for the page buffer forms a functional (e.g., usable for memory operations) part of the memory device, thereby enabling increased memory density and/or miniaturization relative to using dedicated physical unclonable functions, such as SRAM arrays or ring oscillators.

FIGS. 1A-1M are diagrams of an example implementation 100 associated with using a page buffer as a physical unclonable function (PUF) for security key generation. As shown in FIG. 1A, example implementation 100 includes a computing device 102.

As further shown in FIG. 1A, computing device 102 includes a host 110 and a storage system 120. Storage system 120 includes an application-specific integrated circuit (ASIC) 130 and a NAND 140 (e.g., a NAND memory device). NAND 140 includes a controller 142, a page buffer 144 (shown as "PB"), and a set of data nodes 146-1 through 146-N (shown as "DN"). As further shown in FIG. 1A, host 110 and storage system 120 communicate via an interface 150 and ASIC 130 and NAND 140 communicate via an input/output (I/O) interface 160. Additional details of NAND memory devices, such as the NAND 140, are described below in connection with FIG. 7.

Figure 1B:
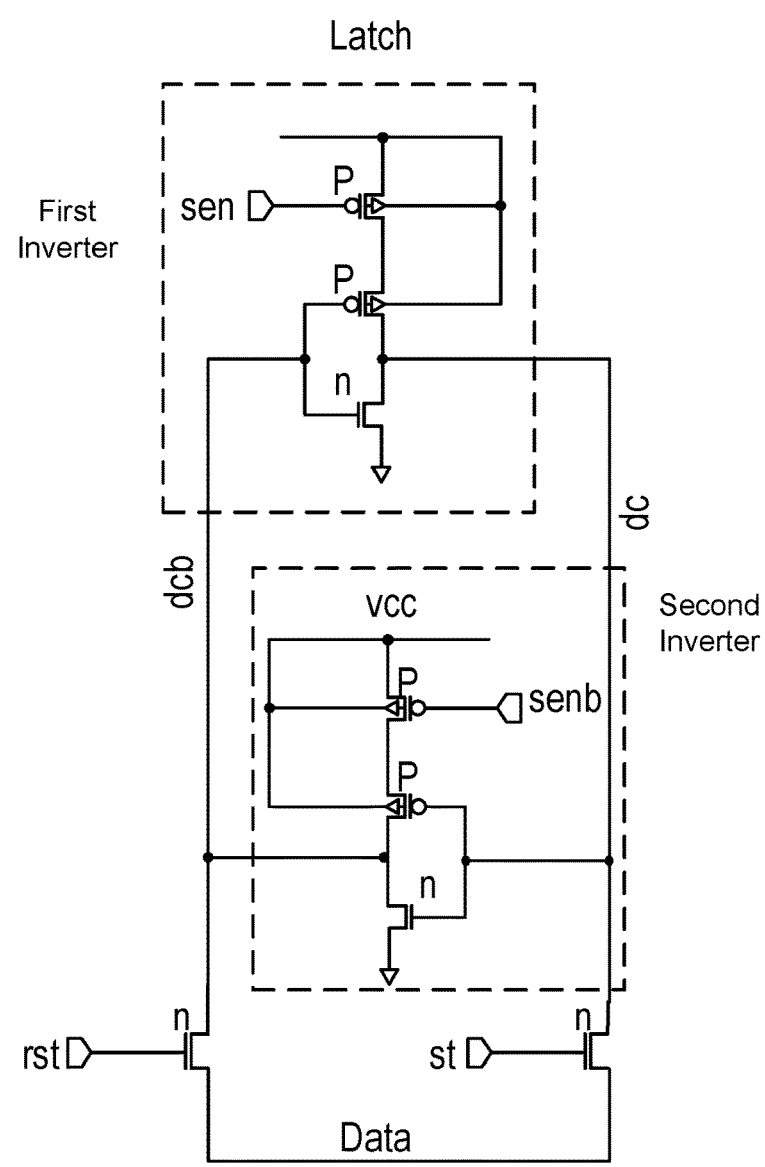

As shown in FIG. 1B, a data node 146 may include a latch with a set of transistors. As an example, an SRAM type latch or data cache latch including a set of transistors and/or other electrical components may form a set of cross coupled inverters and/or a set of gates, as shown. For example, a first inverter may include a first sense amplifier (which may also be referred to as a "sense node" or an "enable control," and which is shown as "sen"), and a second inverter may include a second sense amplifier (shown as "senb"). A first gate may be a set component (which may also be referred to as a "set voltage source," and which is shown as "st"), and a second gate may be a reset component (which may also be referred to as a "reset voltage source," and which is shown as "rst"). The set of data cells may include a first data cell (which may also be referred to as a "data cache," and which is shown as "dc"), a second data cell (which is shown as "dcb"), and a data line. The first inverter may output to "dc" and the second inverter may output to "dcb".

In some implementations, a controller 142 is provided to operate one or more latches. A data state of a latch corresponds to a value on the dc node. For example, a data state of "1" occurs when the dc node is at a voltage Vcc, and a data state "0" occurs when the dc node is at ground. Data is transferred into the latch via the set or "st" device, which will transfer the information, which is on the "data" line to the dc node. However, the state of "dc" is a "1" before the data on "data line" is transferred to "dc". The "st" device is an n-channel metal-oxide semiconductor (NMOS) device and does not pass a full "1" (e.g., pass the voltage Vcc) when the logic controls are all operating at Vcc levels. When "dc" is at a "1" and when "data line" is at 1, the state of "dc" will remain "1". Conversely when "data line" is at "0" or ground the "st" NMOS device can pass a "0," which changes the state of "dc" from a 1 to a 0.

To force "dc" to a 1, the controller 142 first sets "data line" to ground. Next, the latch will be opened, such as by disabling the "first inverter" or the "second inverter". For the case of setting "dc" to "1", the controller 142 disables the second inverter by driving "senb" in FIG. 1B to "1" and by turning off a PMOS device (e.g., the PMOS "P" device that supplies power to the second inverter). With "data" or "data line" at ground the "rst" device is enabled by setting "rst" to "1", which will pass ground voltage to "dcb". As the "first inverter" is still enabled, "dc" will be driven to a "1". Next the data cache node is disconnected from the "data line" and the controller 142 will drive "rst" to "0" and latch the state of "dc" by driving "senb" to "0" and re-enabling "second inverter".

With "dc" now at a "1" data can be transferred into the latch by repeating the aforementioned sequence, but this time with actual data on the "data line" (instead of "0" or ground voltage on the "data line"). Controller 142 drives data onto the "data line", opens the latch setting "sen" to "1" disabling first inverter, and connects the "data line" to "dc" by setting "st" to "1". For the case where data is a "1", "dc" will remain "1". When the "data line" is at "0", the "st" NMOS device will pull the "dc" node down to "0". The "second inverter" is still enabled and changes "dcb" from a "0" to a "1". After data has been transferred to "dc", controller 142 may disconnect the latch from the "data line" by setting "st" to "0". Controller 142 may then the latch by setting "sen" to "0", which re-enables "first inverter".

In another example, data can be transferred to "dcb" in a mirrored process as to the case where controller transfers data to "dc". The controller 142 first sets "dcb" to "1" by grounding "data line", opening the data cache node (e.g., by turning off "first inverter" with the controller 142 causing a "1" to be applied to "sen". The controller 142 sets a "1" on "st" to pass a "0" to "dc". As the "second inverter" is still enabled, the "inverter" will force "dcb" to a "1". The latch is disconnected from the "data line" and the controller 142 sets "st" to "0". The controller 142 closes the latch by setting "sen" to "0", which reenables the "first inverter. To transfer data onto "dcb", the controller 142 transfers the data onto the "data line", opens the latch (e.g., disabling the "second inverter" with "senb"="1"), and passes the "data line" to "dcb" by setting "rst"="1". If the data on the "data line" is a "1", the "dcb" remains as a "1". In contrast, if "data line" is a "0", the "dcb" changes to "0". Once data has been transferred into the data cache node, the controller disconnects the latch and closes the latch by setting "rst" to "0" and by setting "senb" back to "0".

Accordingly, prior to transferring data, which may be a "1" or "0", in some examples, controller 142 preconditions a target node and associated latch to a "1" to ensure proper data transmission across the "rst" or "st" NMOS device. After the target "dc" or "dcb" node has been preconditioned, data can be transferred into the latch using the aforementioned sequences.

Figure 1C:
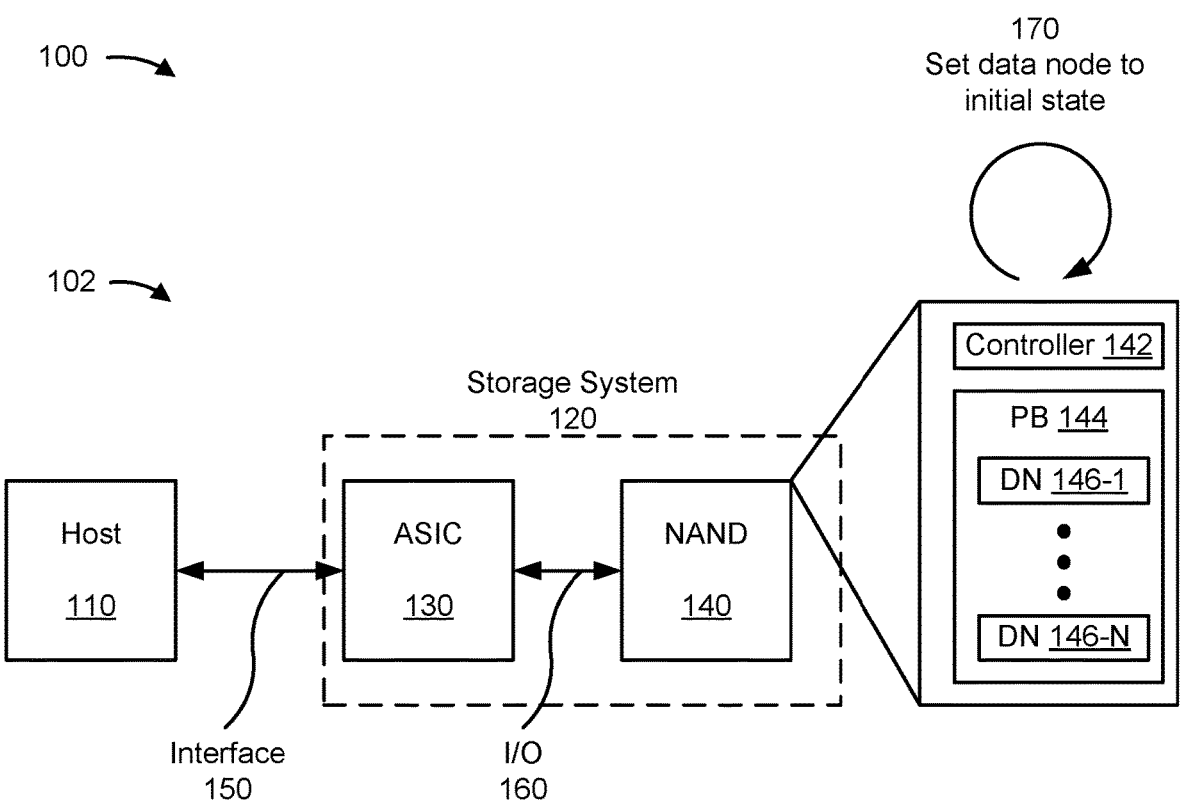
Figure 1D:
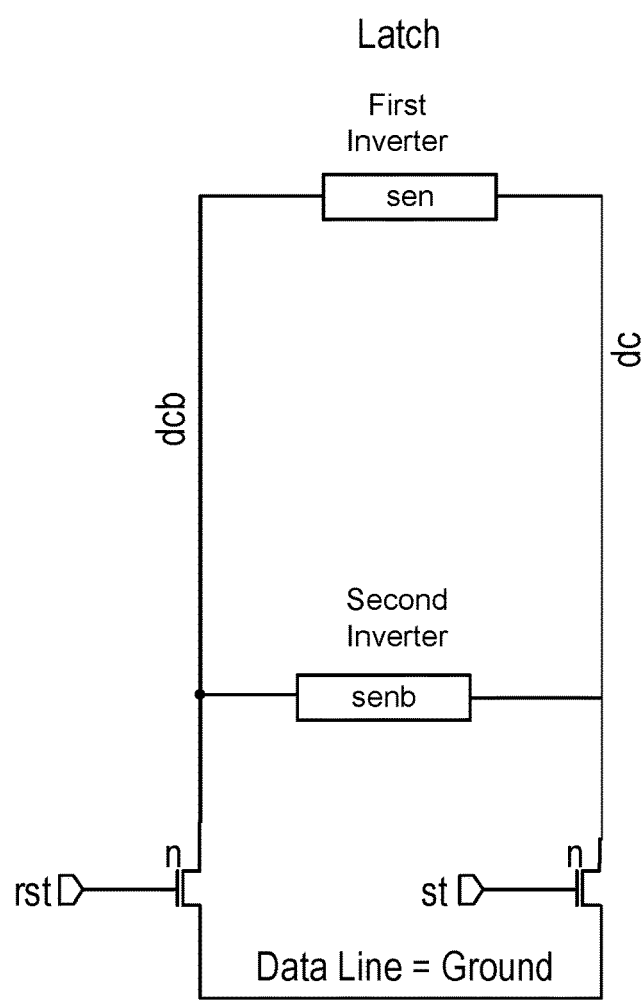

As shown in FIG. 1C, and by reference number 170, controller 142 may set a data node 146 to an initialized state (which may be different from a set state of data node 146—in other words, the initialized state may be a state that is different from the initial state where data node 146 is at a value of "0" or "1"). For example, to provide an output for a physical unclonable function provided by page buffer 144, controller 142 may set data nodes 146 of page buffer 144 to the initialized state. As shown in FIG. 1D, to set data node 146 to the initialized state, controller 142 may set the data line to ground (e.g., to a ground voltage for data node 146). In some implementations, controller 142 may transmit commands to page buffer 144 and data nodes 146 thereof to control data nodes 146.

In some implementations, controller 142 may set the data nodes 146 to the initialized state at a beginning of a power cycle. In some implementations, setting the data nodes 146 to the initialized state at the beginning of the power cycle may include setting the data nodes 146 to the initialized state after one or more other procedures associated with power-up, such as after a NAND initialization sequence, after a chip initialization sequence, at a time when a page buffer is to be initialized, or at a time when availability of an entropy source is requested, among other examples. For example, controller 142 may set the data node 146 to an initialized state when powering on cells of the page buffer. For example, controller 142 may initially power on the page buffer and, as part of powering on the page buffer, controller 142 may cause the page buffer to generate a physical unclonable function. Additionally, or alternatively, controller 142 may use a set of logic commands to re-generate the physical unclonable function output without powering down and powering up (e.g., without a power cycle occurring). For example, controller 142 may control data node 146 to reset data node 146 to an initialized state without powering down the page buffer (e.g., without ending a power cycle). In this way, controller 142 enables re-generation of a security key, as described in more detail herein, without power cycling. By enabling re-generation of the security key without power cycling, computing device 102 obviates a need to maintain the security key for a duration of operation (e.g., computing device 102 and the page buffer 144 thereof can delete the security key during operation and re-generate the security key at a later time without power cycling). This may improve security relative to maintaining the security key throughout a duration of a power cycle (e.g., to have the security key available at any time during the power cycle). For example, allowing generation of the security key for authentication, then deletion of the security key until needed again, reduces an ability of a malicious entity to determine the security key and attempt to recreate or duplicate the security key by retrieving the security key from memory.

Figure 1E:
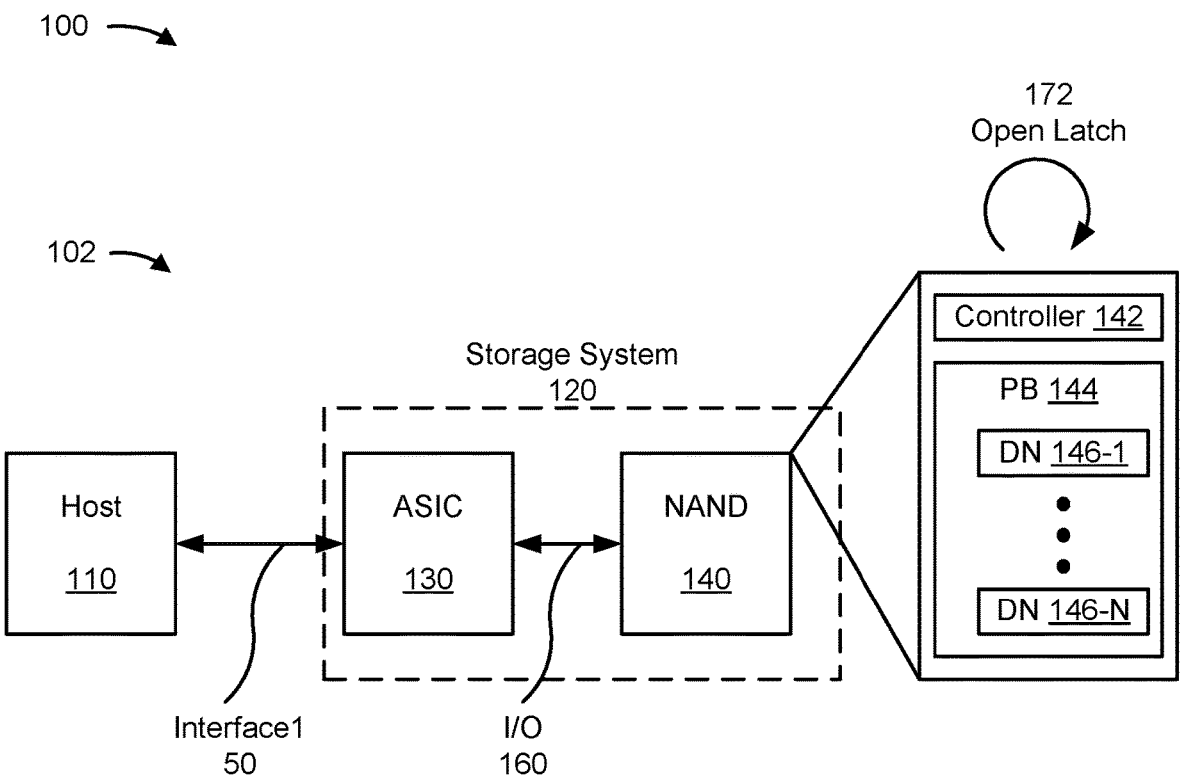
Figure 1F:
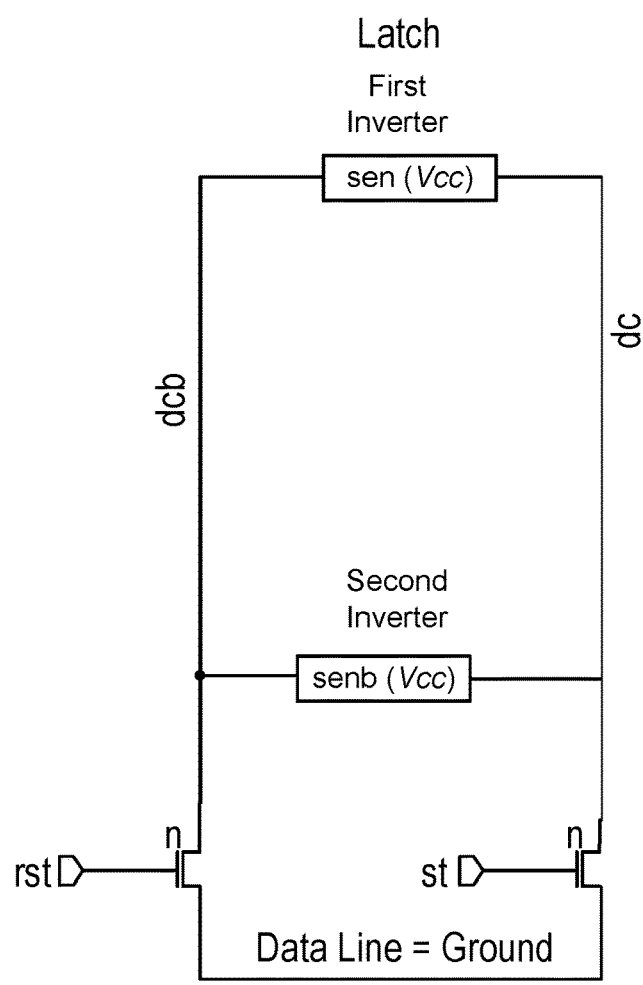

As shown in FIG. 1E, and by reference number 172, controller 142 may open a latch of data node 146. For example, controller 142 may set latches of data nodes 146 to an open state. In some implementations, controller 142 may open data cache elements 146 in page buffer 144 by concurrently disabling the "first inverter" and the "second inverter" by setting "sen" and "senb" to "1". As shown in FIG. 1F, controller 142 may open the latch of data node 146 and set the first sense amplifier of the first inverter and the second sense amplifier of the second inverter to a control voltage, Vcc. In this case, the P-type metal-oxide-semiconductor (PMOS) components of the latch are set to an off state. With first and second inverters disabled both feedback paths are eliminated leaving "dc" and "dcb" to float (e.g., be at ground or another configured state).

Figure 1G:
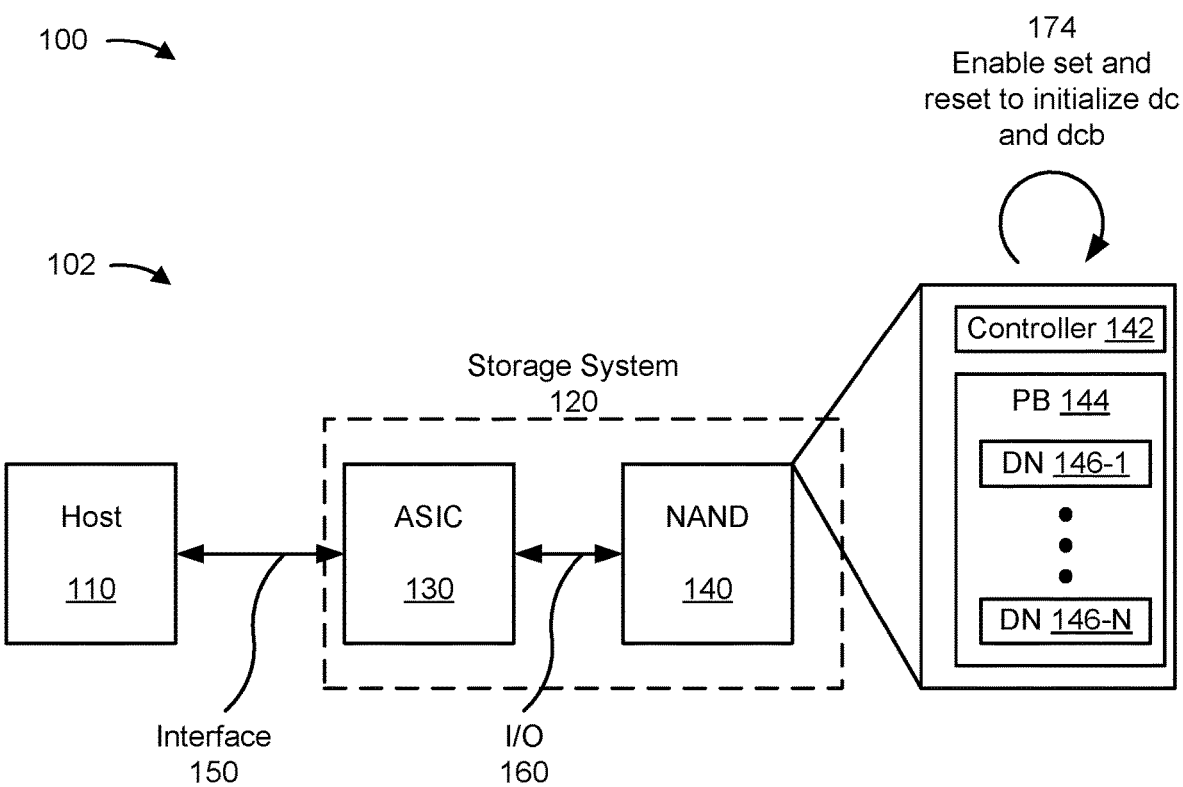
Figure 1H:
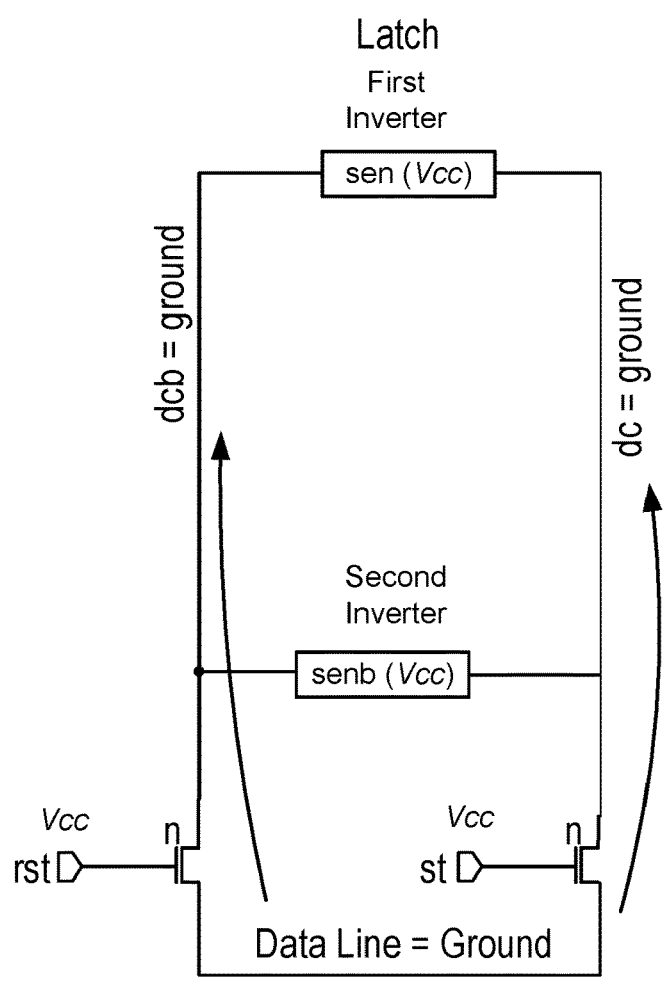

As shown in FIG. 1G, and by reference number 174, controller 142 may enable the set component and the reset component to initialize the first data cell and the second data cell of data node 146 (controller 142 may have previously driven "data line" to ground). For example, controller 142 may enable set voltage sources and reset voltage sources, concurrently, for each latch of each data node 146 to initialize data caches of each latch to ground voltage. In contrast, during memory write operations only one of the set component or the reset component is enabled at a single time. In some implementations, controller 142 may transmit a set command and a reset command (e.g., concurrently) to connect "dc" and "dcb" to the "data line", thereby forcing "dc" and "dcb" to ground or "0", as shown in FIG. 1H. As shown in FIG. 1H, by enabling both the set component and the reset component, the first data cell and the second data cell are grounded, thereby initializing the first data cell and the second data cell (e.g., forcing both the data cells to ground voltage). For example, both the first data cell and the second data cell are forced to 0 volts. The set component and the reset component may have control voltage, Vcc applied.

Figure 1I:
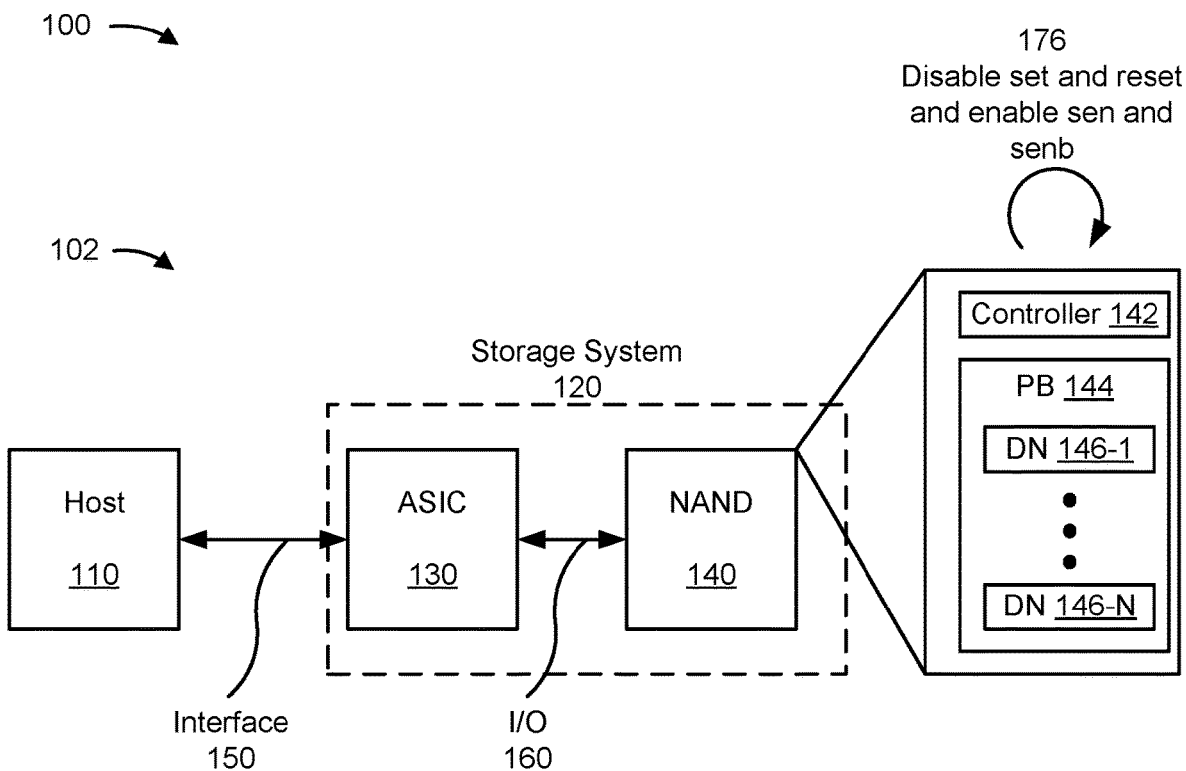
Figure 1J:
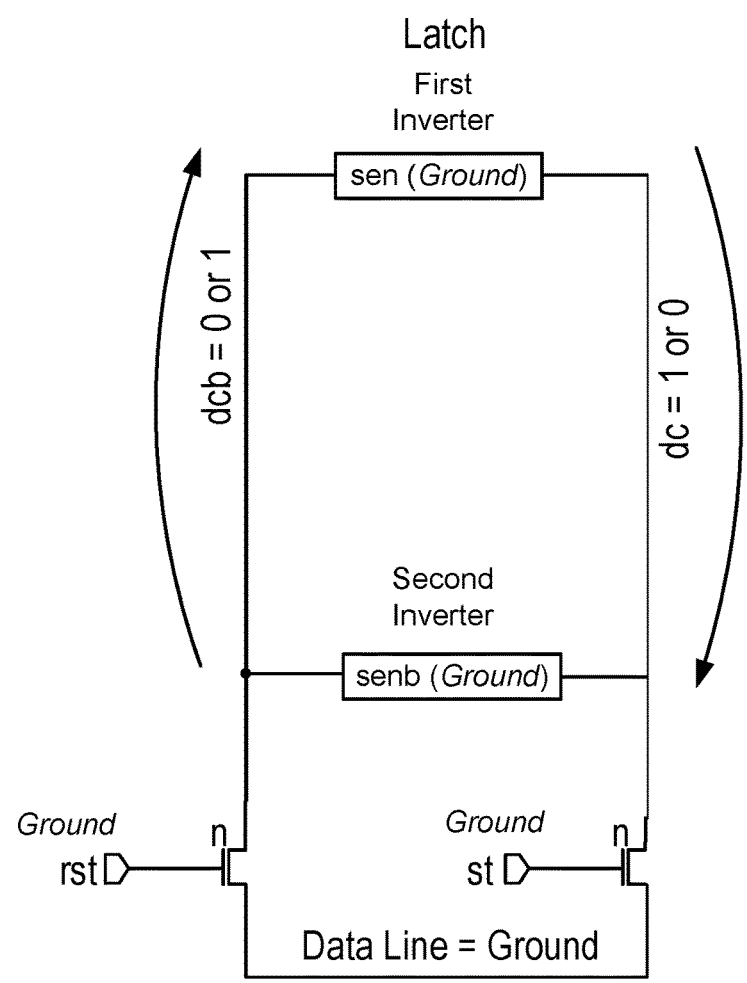

As shown in FIG. 1I, and by reference number 176, controller 142 may disable the set component and the reset component and enable the first sense amplifier and the second sense amplifier. For example, controller 142 may disable the set voltage sources and the reset voltage sources of latches of data nodes 146, concurrently, and enable the sense nodes of data nodes 146, concurrently, to resolve data caches of data nodes 146 to initialized values. An initialized state may be achieved by disconnecting data cache elements from the "data line" (e.g., by concurrently setting "st" and "rst" to "0" followed by concurrently enabling "first inverter" and second inverter"), thereby driving "sen" and "senb" to "0". The initial state is achieved as each selected data node 146 in page buffer 144 will be forced to have "dc" resolve to a "1" or "0" (based on process variations), as shown in FIG. 1J. The initialized state may be highly repeatable with a typical data variation of approximately 5% across the page buffer with the maximum variation being less than approximately 10%. As shown in FIG. 1J, by concurrently disabling the set component and reset component and the sense amplifiers of the inverters (e.g., sen of the first inverter and senb of the second inverter), controller 142 forces the latch to resolve to 1 or 0. For example, with both the first data cell and the second data cell at ground voltage (and a value of '0') and the sense amplifiers enabled, the sense amplifiers force the data cells to resolve to an initialized value. In a first case, controller 142 forces the first data cell to resolve to '1' and the second data cell to resolve to the inverse of the first data cell (e.g., '0'). In a second case, controller 142 forces the first data cell to resolve to '0' and the second data cell to resolve to the invers of the first data cell (e.g., '1').

Whether the first data cell resolves to '0' or '1' (and whether the second data cell resolves to '1' or '0') may be based on process variations in each latch (e.g., relatively minute process variations in a latch introduced during a manufacturing or fabrication process). For example, differences in a structure of the first inverter and the second inverter (e.g., differences within process parameters, such as a design tolerance, for which the inverter still operates properly) can cause the first data cell to resolve one way or another. In this case, the differences in structure may be small enough so as to not be physically discernable (e.g., by an unaided inspection, by inspection using some measurement tools). An example of a difference in structure, corresponding to the relatively minute process variations, may include an implantation difference (e.g., a difference, between latches, in concentrations of different materials, such as boron or phosphorus in layers or structures of a respective latch, which may be difficult to measure). A result of a difference in process variations may be a difference in drive strength for, for example, an NMOS or PMOS device or a MOSFET. Accordingly, a data set of initialized values from multiple latches with different process variations can form a physical unclonable function key data set for generating a security key.

In some implementations, the first data cell may resolve probabilistically. For example, the process variations may cause the first data cell to resolve to '1' with a first probability and to '0' with a second probability. The first probability and the second probability may be sufficiently different (e.g., 99% and 1%, respectively) that, collectively, across many data cells of many latches, error correction techniques can be used to accommodate instances where a data cell resolves to a less likely state (e.g., the 1% case). In other words, if a set of data cells of a set of latches resolve to a string of values '111001100' with a 95% frequency, error correction algorithms may enable recall of the string '111001100' even in the 5% of cases where the set of data cells of the set of latches resolve to a different string of values (e.g., '011001100' instead of '111001100').

Figure 1K:
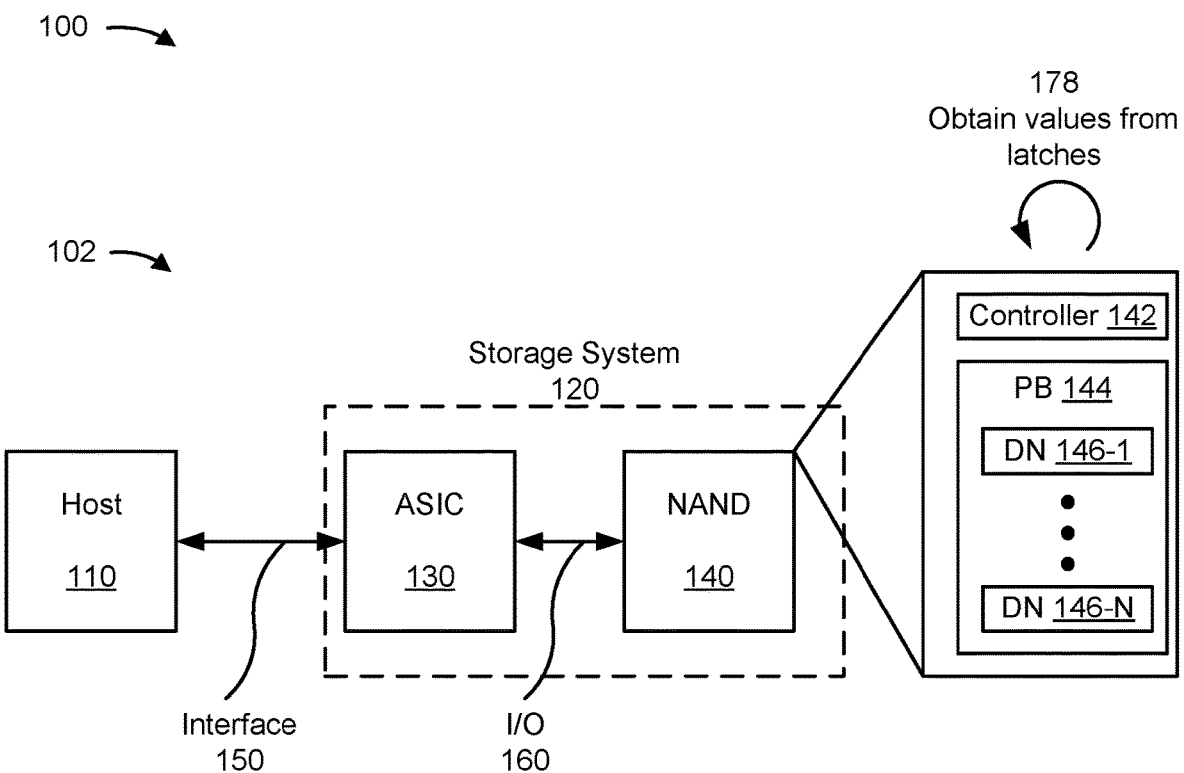

As shown in FIG. 1K, and by reference number 178, controller 142 may obtain a value from a latch of data node 146. For example, to provide an output for a physical unclonable function provided by page buffer 144, controller 142 may obtain values from the latches of data nodes 146. In this case, controller 142 may measure the latches (e.g., measure voltages of the latches) of the data nodes 146 to read out bit values for the data cells of the data nodes. In other words, controller 142 may perform a read operation to read the data on the latches of page buffer 144 based on forcing the latches to resolve data cells thereof to initialized values. In this case, controller 142 may read a set of initialized values (e.g., bits) from the set of latches as a string of binary values. As an example, for a 4-plane NAND device, each element of a page buffer 144 may have a width of approximately 18,000 bytes, which results in 144,000 total bits in each page buffer element. The page buffer elements include a primary data cache and a secondary data cache. For example, page buffer 144 may include 4 primary data caches, a secondary data cache, and a sense amplifier (SA) latch, for a total of 6 different SRAM type elements across 144,000 bits and 4 planes, resulting in 6×144,000× 4=3,456,000 usable latches that are available to output respective bits.

Controller 142 may initialize any latch within page buffer 144 across the entire page buffer width at any time the sequence is required to generate the data set needed for key generation. Once the page buffer element has been initialized the data may be transferred to controller 142 or fixed hardware to derive the actual key which may be stored in nonvolatile section of the NAND. The key will be only valid while power is applied to the NAND device. When power is lost there will not be a way to determine the key. Upon power being re-applied controller 142 may reinitialize the page buffer, transferred to controller 142 or hardware to again rederive the security key.

In some implementations, controller 142 may obtain a NAND page buffer initialized data set from the set of initialized values of the set of latches. For example, controller 142 may obtain a hexadecimal string (e.g., a 4096 byte string, in one example) based on the bit outputs form the latches of the data nodes 146 of the page buffer 144. In this case, a size of the NAND page buffer initialized data set (and the set of initialized values of data caches of latches from which the NAND page buffer initialized data set is generated) is based on a width of page buffer 144 (and a quantity of latches of page buffer 144). For example, a larger page buffer 144 can produce a larger NAND page buffer initialized data set, which can achieve a higher level of security by enabling generation of a larger security key. In some implementations, the NAND page buffer initialized data set can be used by controller 142 to generate a 1-time key, which can be stored in volatile memory.

In some implementations, controller 142 may perform an error correction procedure on the bit outputs, the NAND page buffer initialized data set, and/or the security key (as described in more detail herein). For example, controller 142 may use a first subset of bits as error correction bits (e.g., helper data, as described in more detail herein) for a second subset of bits in accordance with one or more available error correction algorithms. In this case, controller 142 may generate a security key using an error corrected NAND page buffer initialized data set, which may reduce a likelihood that probabilistic variations in the NAND page buffer initialized data set result in an incorrect (e.g., unexpected) security key being generated. In this way, controller 142 can account for the data cells probabilistically resolving to bit values rather than deterministically resolving to bit values. In some implementations, controller 142 may be capable of performing error correction for up to a threshold error percentage within the bit outputs, the NAND page buffer initialized data set, and/or the security key. For example, in accordance with some error correction algorithms, controller 142 may perform error correction with up to a 10% error rate (e.g., controller 142 is capable of recovering a desired set of values from a measured set of values relative to the desired set of values as long as the error rate in the measured set of values is less than 10%).

Figure 1L:
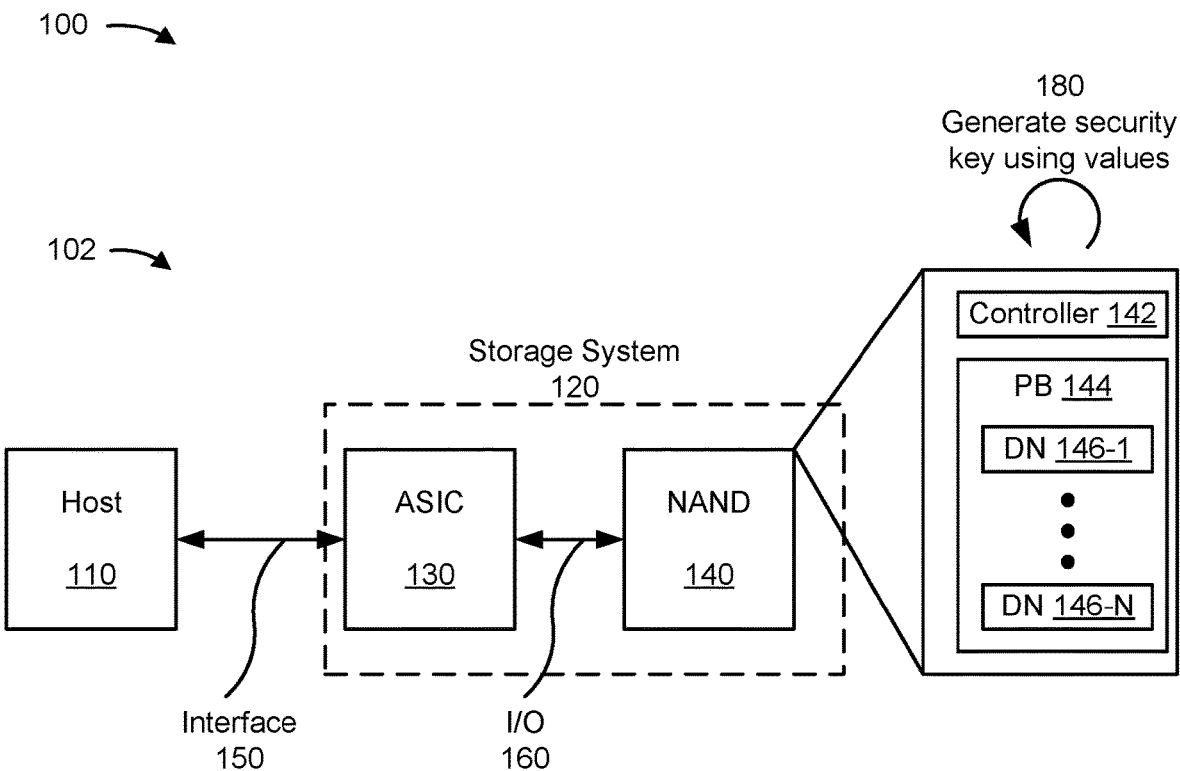

As shown in FIG. 1L, and by reference number 180, controller 142 may generate a security key using the values from the latches of data node 146. For example, controller 142 may apply a security key generation algorithm, such as a hash-based message authentication code (HMAC) algorithm among other examples, to generate a security key (or another type of cryptographic signature) using the NAND page buffer initialized data set. In some implementations, controller 142 may generate the security key and use an asymmetric key utilization scheme (e.g., a shared-secret technique) to use the security key for secure exchanges between NAND 140 and other devices or components without exposing the security key.

In some implementations, controller 142 may select one or more subsets of helper data. For example, in connection with error correction of the NAND page buffer initialized data set, controller 142 may select one or more subsets of a set of helper data associated with error correction of the NAND page buffer initialized data set. In this case, controller 142 may generate one or more security keys corresponding to the one or more subsets of the set of helper data. In this way, controller 142 may generate multiple security keys, such as for multiple security operations, from a single physical unclonable function.

Figure 1M:
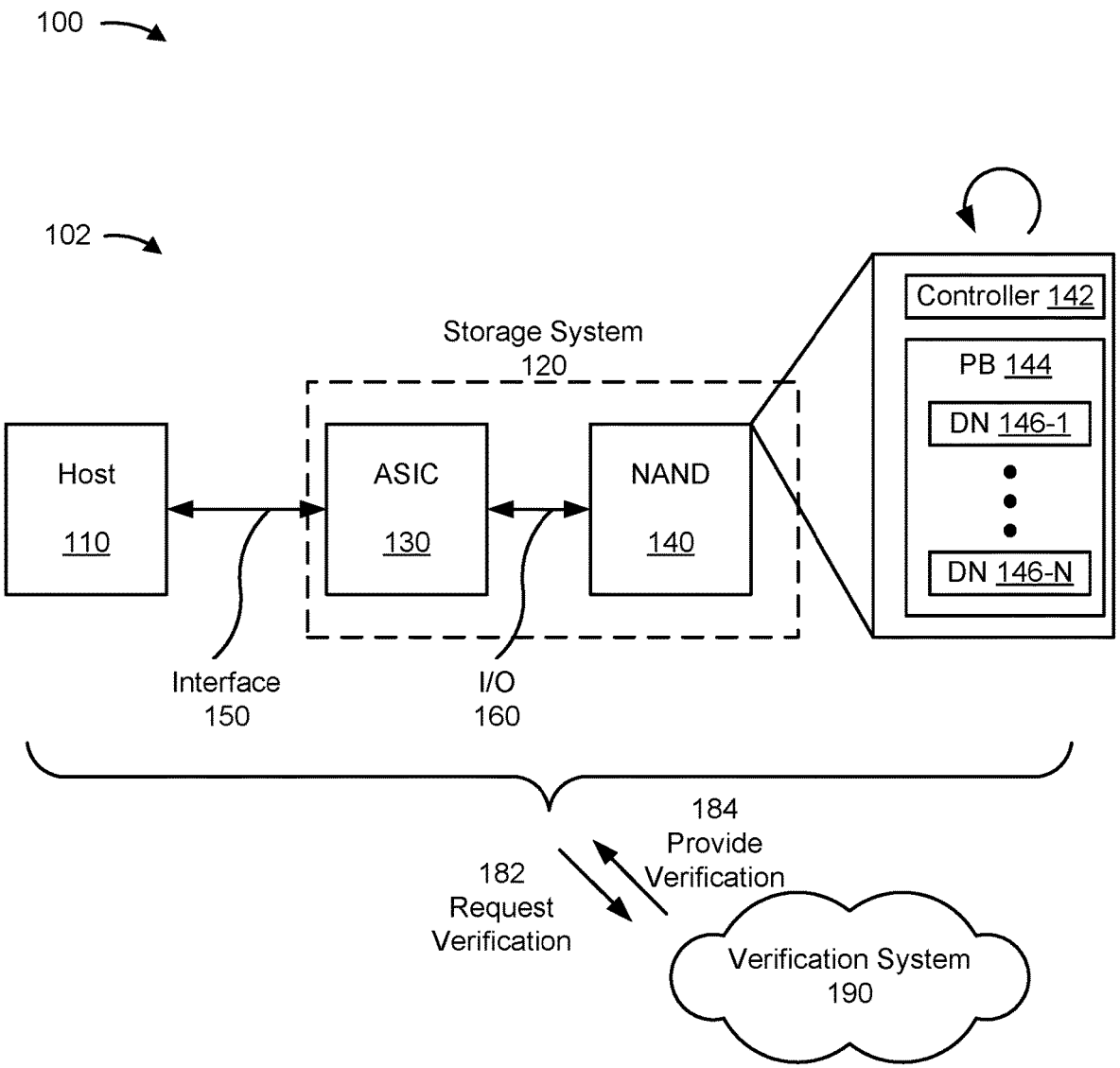

As shown in FIG. 1M, and by reference numbers 182 and 184, computing device 102 may request verification and receive verification from a verification system 190. For example, computing device 102 (e.g., using host 110, storage system 120, or controller 142) may communicate with a verification system 190 to verify that, for example, NAND 140 is genuine. In this case, computing device 102 may use the security key generated using the physical unclonable function of NAND 140 to verify NAND 140 against an expected security key for NAND 140 (e.g., using a security key verification algorithm, such as a handshake algorithm). In this way, computing device 102 may verify a security state associated with the NAND 140 and page buffer 144 thereof using a physical unclonable function provided by page buffer 144.

In some implementations, verification system 190 may verify a command for computing device 102. For example, when computing device 102 is to execute a command associated with NAND 140 (e.g., a command passed between NAND 140 and host 110), verification system 190 may verify the command using an accompanying security key or signature (e.g., an HMAC signature) generated based on the physical unclonable function of NAND 140. In some implementations, computing device 102 may use an HMAC signature associated with a secret key (e.g., a security key available to storage system 120) and a value from a monotonic counter and/or a cryptographic nonce to generate an HMAC result for authenticating or verifying commands. In this case, based on authenticating the command as being accompanied by the security key or signature, verification system 190 may cause computing device 102 to execute the command. In this way, verification system 190 (which may be a component of computing device 102, as described herein) and the physical unclonable function of page buffer 144 enable security for command execution in a computing device 102 that includes a storage device 120.

In some implementations, computing device 102 may maintain the security key and/or the NAND page buffer initialized data set while NAND 140 and page buffer 144 are powered on. For example, computing device 102 may maintain (e.g., store) the security key in a non-volatile space, such as a non-volatile memory space. Additionally, or alternatively, computing device 102 may write over values in page buffer 144 to use page buffer 144 for data storage and/or memory operations. In some implementations, computing device 102 may release (e.g., delete) the security key and/or the NAND page buffer initialized data set. For example, computing device 102 may release the NAND page buffer initialized data set to write to page buffer 144. Additionally, or alternatively, computing device 102 may release the security key and the NAND page buffer initialized data set when powering off NAND 140 and page buffer 144. Additionally, or alternatively, computing device 102 may release the security key while NAND 140 is powered on. In this case, as described above, computing device 102 may subsequently transmit one or more commands to page buffer 144 to reset page buffer 144 to an initialized state and cause regeneration of the security key without power cycling computing device 102, NAND 140, and page buffer 144, thereby enabling transience for the security key.

In some implementations, verification system 190 may be a remote server. For example, a manufacturer of NAND 140 may test NAND 140 to determine one side of the handshake algorithm before providing NAND 140 to a customer. Subsequently, a customer computing device 102 that includes NAND 140 can communicate with a remote server of the manufacturer to verify that NAND 140 is genuine and has not been replaced with a malicious duplicate. In some implementations, verification system 190 may be a component of computing device 102. For example, rather than a remote server, verification system 190 may be a server internal to the customer or a component of computing device 102 that is programmed with an expectation for the handshake algorithm that can be confirmed, on command, by NAND 140 generating the security key. As an example, NAND 140 may receive a challenge sequence and provide a challenge response using the initialized data set (e.g., using the security key, the entropy data, etc.). In this example, the verification 190 may receive the challenge response, determine whether the challenge response is accurate, and provide a response (e.g., a security key) enabling use of the NAND 140 based on the NAND 140 providing a successful or accurate challenge response. In some aspects, data that is exchanged between, for example, NAND 140 and verification system 190 may be wrapped using one or more security techniques to avoid intercept of data being exchanged between NAND 140 and verification system 190.

In some implementations, computing device 102 may perform a set of memory operations on page buffer 144. For example, as described above, based on page buffer 144 providing a non-dedicated physical unclonable function (e.g., based on memory operations not causing excess degradation to transistors of page buffer 144), computing device 102 may perform a read operation, a write operation, or an overwrite operation, among other examples. In this way, computing device 102 reuses the integrated circuit on which page buffer 144 is formed for both a physical unclonable function and for functional memory space, thereby increasing an efficiency with which available space on the integrated circuit is used to achieve higher levels of memory density.

As indicated above, FIGS. 1A-1M are provided as an example. Other examples may differ from what is described with regard to FIGS. 1A-1M.

Figure 2A:
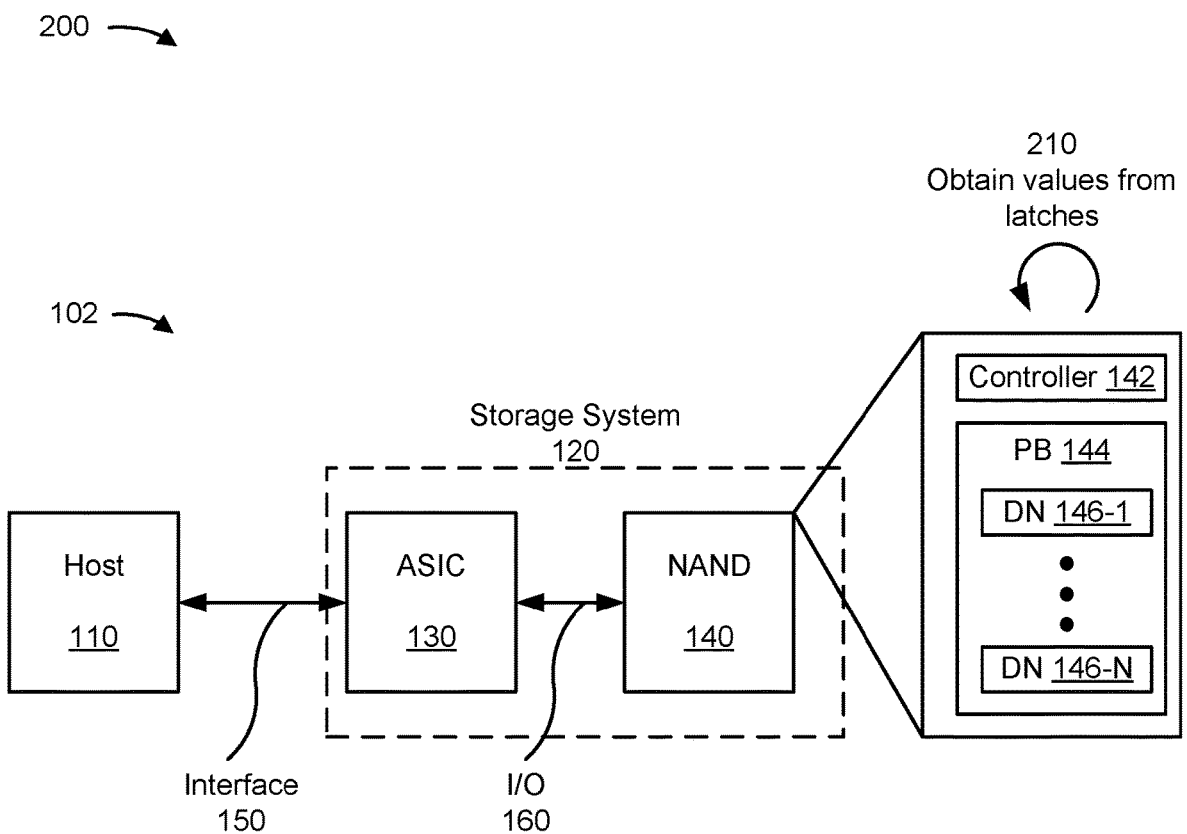
FIGS. 2A-2C are diagrams illustrating an example of using a page buffer as an entropy source.
Figure 2B:
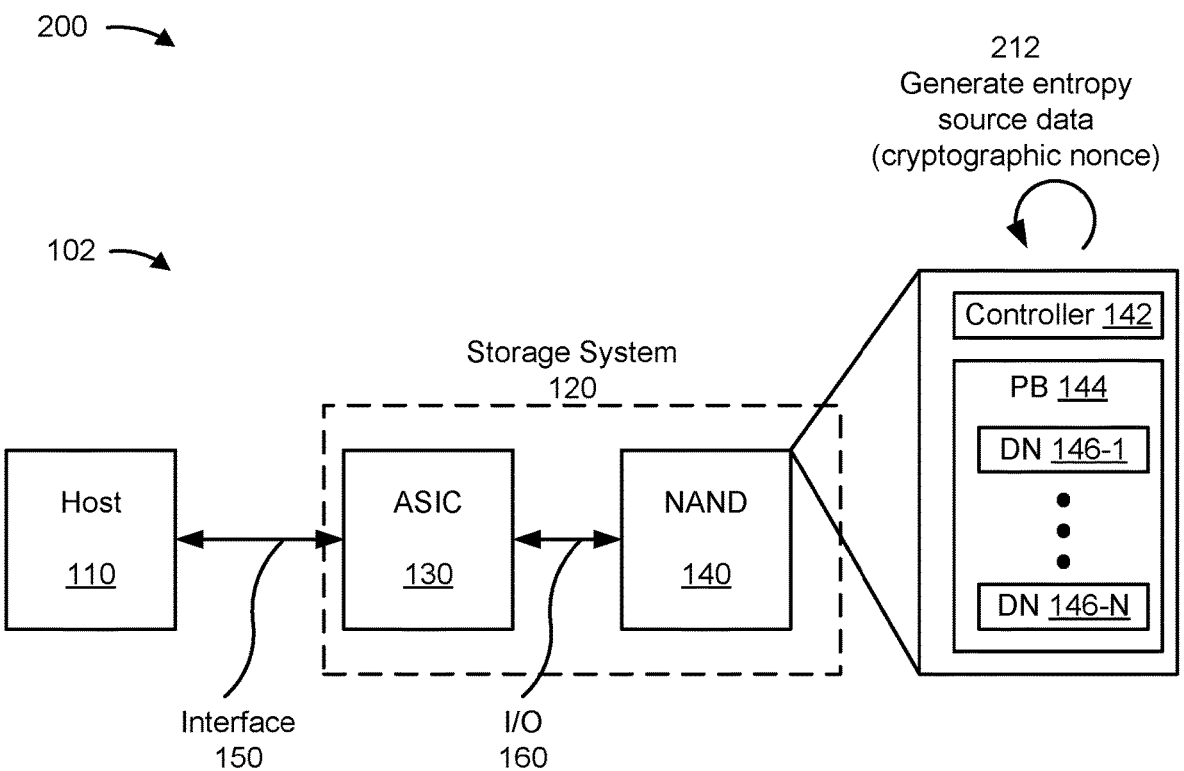
Figure 2C:
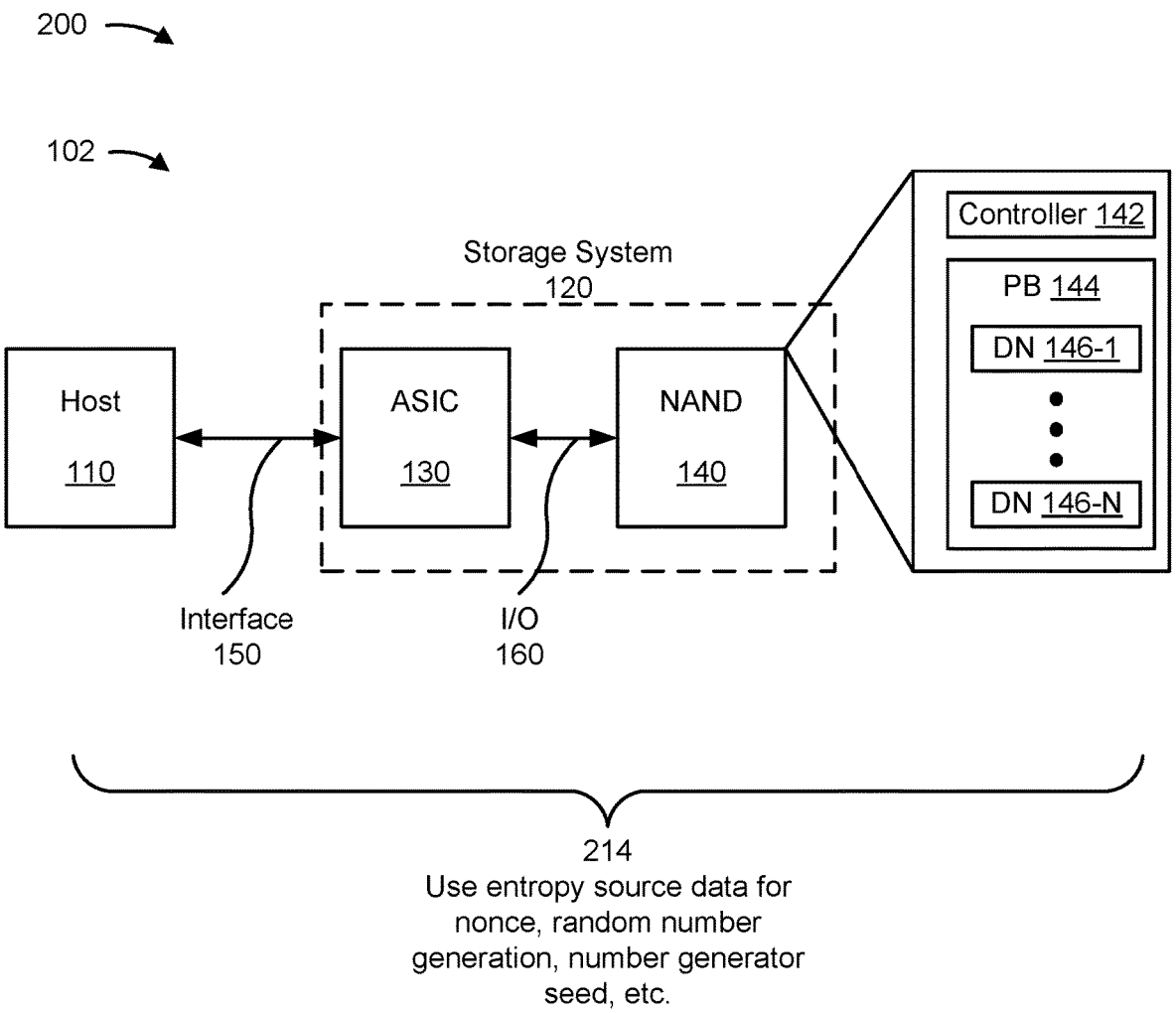

FIGS. 2A-2C are diagrams of an example implementation 200 associated with using a page buffer as an entropy source. As shown in FIGS. 2A-2C, example implementation 200 includes the computing device 102.

As further shown in FIG. 2A, and by reference number 210, controller 142 may obtain values from latches of page buffer 144. For example, as described above, based on resolving data cells of the latches of page buffer 144 to an initialized value, controller 142 may measure the data cells and obtain the values from the data cells. In some implementations, controller 142 may generate one or more composite initialized values. For example, controller 142 may combine a plurality of initialized values (e.g., by performing an XOR operation on, or XORing, a first initialized value with a second initialized value) to generate a composite initialized value. As shown in FIG. 2B, and by reference number 212, controller 142 may generate entropy source data. For example, controller 142 may generate a cryptographic nonce using the bits obtained from the data cells of the latches of page buffer 144.

As shown in FIG. 2C, and by reference number 214, rather than generating a security key or other signature, computing device 102 can use the entropy source data for the cryptographic nonce, for random number generation, or as a number generator seed, among other examples. For example, computing device 102 may generate a random number using a value from the entropy source data. Additionally, or alternatively, computing device 102 may seed an algorithm based on a value (or a hash of a set of values) from the entropy source data, such as seeding a random number generation algorithm, seeding a security key generation algorithm, or seeding a hash algorithm. Additionally, or alternatively, computing device 102 may generate a digest. For example, based on the entropy source data, computing device 102 may generate a digest and use the digest to generate a device server root key, which may be stored in non-volatile space, for data integrity protection. In this case, controller 142 may receive a request to update a server root key to a client root key or to update a current client root key to a new client root key. NAND 140 may validate the command using a security key and may execute firmware to update the client root key. After updating the client root key, NAND 140 may update a record in a security read only memory (ROM) block and cause the server root key or a prior client root key to become invalid. In this way, inclusion of a physical unclonable function in NAND 140 enables generation of entropy data for use in randomization procedures by host 110 and/or computing device 102.

As indicated above, FIGS. 2A-2C are provided as an example. Other examples may differ from what is described with regard to FIGS. 2A-2C.

Figure 3:
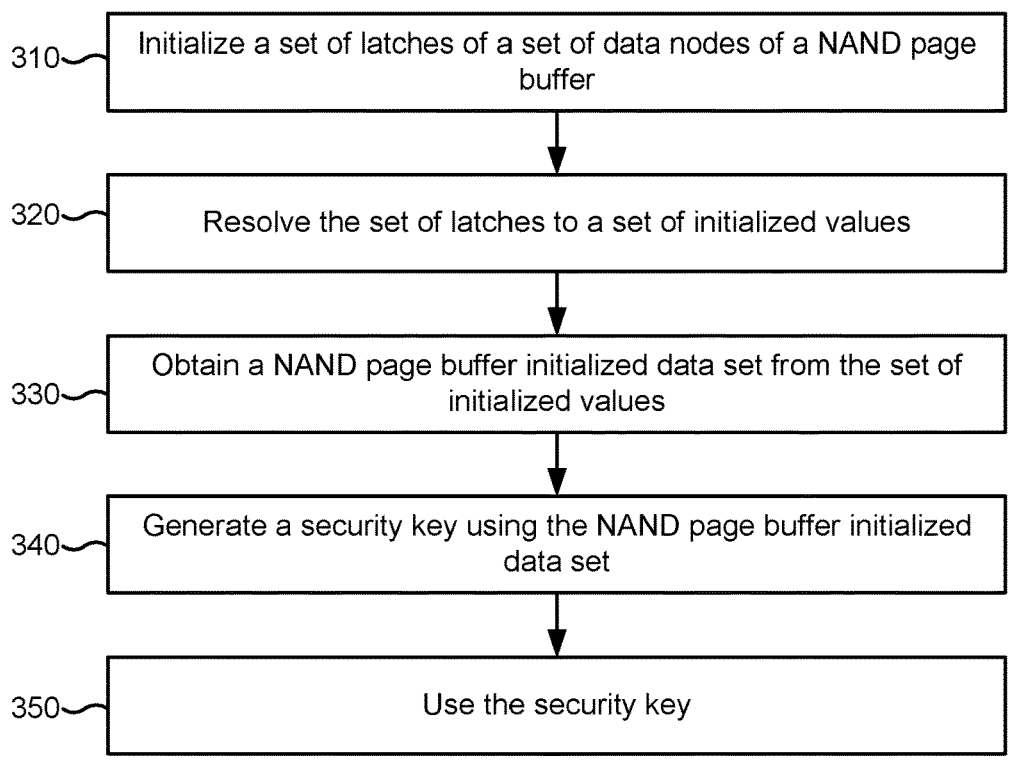
FIGS. 3-5 are diagrams of example processes for controlling a page buffer.

FIG. 3 is a flowchart of an example method 300 associated with NAND page buffer based security operations. In some implementations, one or more process blocks of FIG. 3 may be performed by a memory device (e.g., computing device 102 or storage system 120 thereof, among other examples of apparatuses). In some implementations, one or more process blocks of FIG. 3 may be performed by another device or a group of devices separate from or including the memory device. Additionally, or alternatively, one or more process blocks of FIG. 3 may be performed by one or more components of the memory device.

As shown in FIG. 3, the method 300 may include initializing a set of latches of a set of data nodes of a NAND page buffer (block 310). As further shown in FIG. 3, the method 300 may include resolving the set of latches to a set of initialized values (block 320). As further shown in FIG. 3, the method 300 may include obtaining a NAND page buffer initialized data set from the set of initialized values (block 330). As further shown in FIG. 3, the method 300 may include generating a security key using the NAND page buffer initialized data set (block 340). As further shown in FIG. 3, the method 300 may include using the security key (block 350).

Although FIG. 3 shows example blocks of a method 300, in some implementations, the method 300 may include additional blocks, fewer blocks, different blocks, or differently arranged blocks than those depicted in FIG. 3. Additionally, or alternatively, two or more of the blocks of the method 300 may be performed in parallel. The method 300 is an example of one method that may be performed by one or more devices described herein. These one or more devices may perform one or more other methods based on operations described herein, such as the operations described in connection with FIGS. 1A-1M. In some implementations, these one or more devices may include means for performing one or more methods based on operations described herein, such as one or more components described elsewhere herein.

Figure 4:
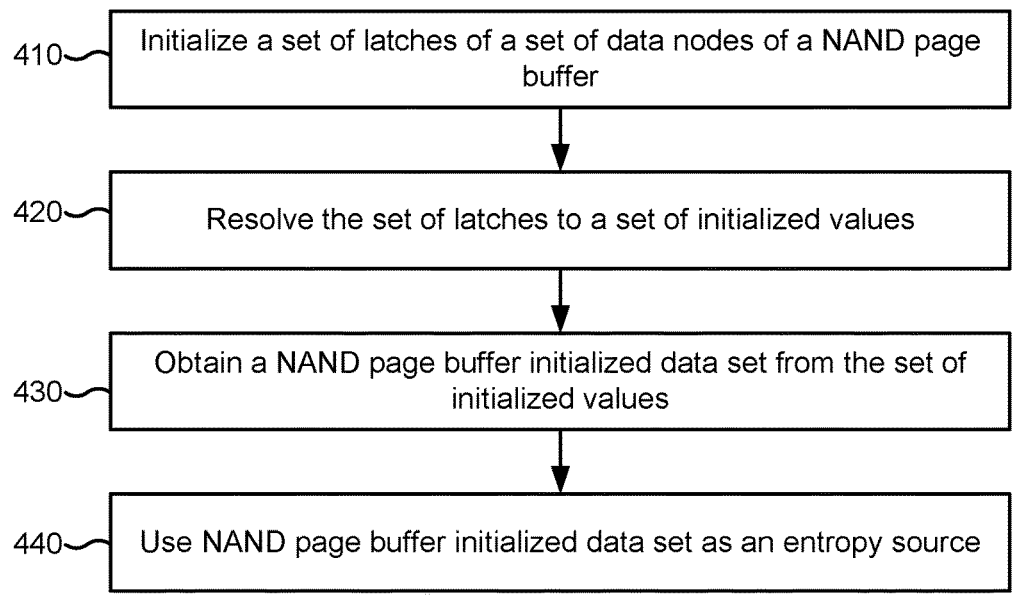

FIG. 4 is a flowchart of an example method 400 associated with NAND page buffer based security operations. In some implementations, one or more process blocks of FIG. 4 may be performed by a memory device (e.g., computing device 102 or storage system 120 thereof, among other examples). In some implementations, one or more process blocks of FIG. 4 may be performed by another device or a group of devices separate from or including the memory device. Additionally, or alternatively, one or more process blocks of FIG. 4 may be performed by one or more components of the memory device.

As shown in FIG. 4, the method 400 may include initializing a set of latches of a set of data nodes of a NAND page buffer (block 410). As further shown in FIG. 4, the method 400 may include resolving the set of latches to a set of initialized values (block 420). As further shown in FIG. 4, the method 400 may include obtaining a NAND page buffer initialized data set from the set of initialized values (block 430). As further shown in FIG. 4, the method 400 may include using the NAND page buffer initialized data set as an entropy source (block 440).

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform one or more other methods based on operations described herein, such as the operations described in connection with FIGS. 2A-2C. In some implementations, these one or more devices may include means for performing one or more methods based on operations described herein, such as one or more components described elsewhere herein.

Figure 5:
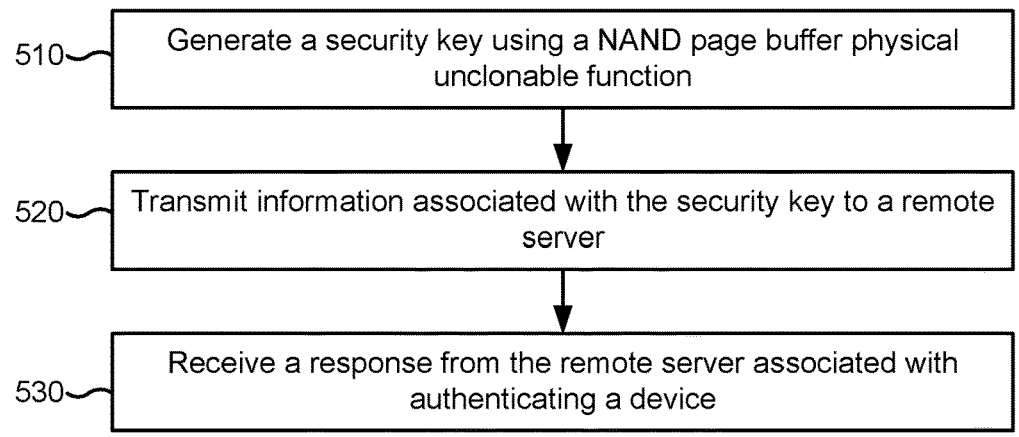

FIG. 5 is a flowchart of an example method 500 associated with NAND page buffer based security operations. In some implementations, one or more process blocks of FIG. 5 may be performed by a memory device (e.g., computing device 102 or storage system 120 thereof, among other examples). In some implementations, one or more process blocks of FIG. 5 may be performed by another device or a group of devices separate from or including the memory device. Additionally, or alternatively, one or more process blocks of FIG. 5 may be performed by one or more components of the memory device. In some implementations, method 500 may be performed in a secure manufacturing environment as a part of a configuration procedure or a NAND device.

As shown in FIG. 5, the method 500 may include generating a security key using a NAND page buffer physical unclonable function (block 510). As further shown in FIG. 5, the method 500 may include transmitting information associated with the security key to a remote server (block 520). As further shown in FIG. 5, the method 500 may include receiving a response from the remote server associated with authenticating a device (block 530).

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform one or more other methods based on operations described herein, such as the operations described in connection with FIGS. 1A-1M and/or 2A-2C. In some implementations, these one or more devices may include means for performing one or more methods based on operations described herein, such as one or more components described elsewhere herein.

Figure 6:
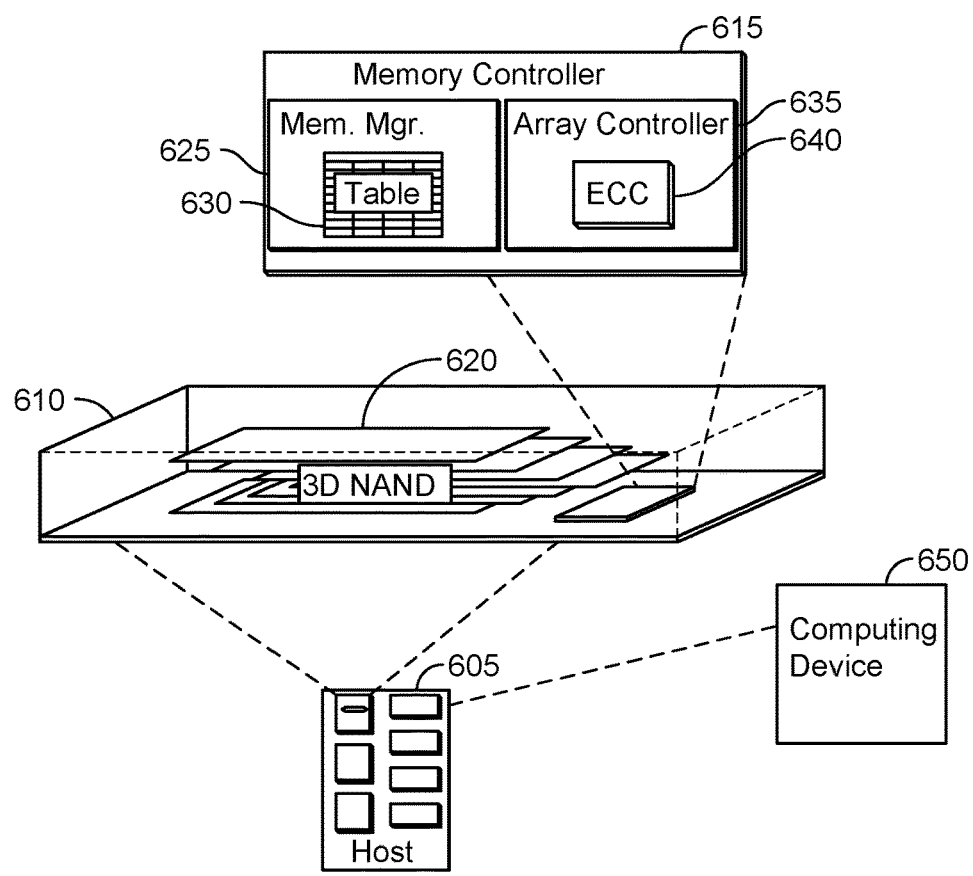
FIG. 6 is a diagram illustrating an example computing system including a NAND device.

FIG. 6 is a diagram of an example environment 600 that includes a computing system including a NAND device. As shown in FIG. 6, the environment 600 includes a host device 605 and a memory device 610 configured to communicate over a communication interface. The host device 605 and/or the memory device 610 may be included in a variety of computing devices 650, such as a computer, a server, or an Internet of Things (IoT) device (e.g., a refrigerator or other appliance, sensor, motor or actuator, mobile communication device, automobile, or drone), among other examples, to support processing, communication, or control of the computing device 650. In some implementations, the host device 605, the memory device 610, and/or the computing device 650 may correspond to any one or more of the computing device 102, the host 110, or the storage system 120 (and/or any one or more components thereof), among other examples.

The memory device 610 includes a memory controller 615 (which may correspond to the controller 142) and a memory array 620 including, for example, a set of individual memory dies (e.g., a stack of three-dimensional (3D) NAND dies). In 3D architecture semiconductor memory technology, vertical structures can be stacked, increasing the quantity of tiers, physical pages, and accordingly, the density of a memory device (e.g., a storage device). In an example, the memory device 610 can be a discrete memory or storage device component of the host device 605. In other examples, the memory device 610 can be a portion of an integrated circuit (e.g., a system on a chip (SOC)), stacked or otherwise included with one or more other components of the host device 605.

One or more communication interfaces can be used to transfer data between the memory device 610 and one or more other components of the host device 605, such as a Serial Advanced Technology Attachment (SATA) interface, a Peripheral Component Interconnect Express (PCIe) interface, a Universal Serial Bus (USB) interface, a Universal Flash Storage (UFS) interface, an embedded multimedia card (eMMC) interface, or one or more other connectors or interfaces. The host device 605 can include a host system, an electronic device, a processor, a memory card reader, or one or more other electronic devices external to the memory device 610. In some examples, the host device 605 and/or computing device 650 may be one or more devices having one or more of the components described herein with regard to FIG. 9.

The memory controller 615 can receive instructions from the host device 605, and can communicate with the memory array, such as to transfer data to (e.g., write or erase) or from (e.g., read) one or more of the memory cells, planes, sub-blocks, blocks, or pages of the memory array. The memory controller 615 can include, among other things, circuitry or firmware, including one or more components or integrated circuits. For example, the memory controller 615 can include one or more memory control units, circuits, or components configured to control access across the memory array 620 and to provide a translation layer between the host device 605 and the memory device 610. The memory controller 615 can include one or more input/output (I/O) circuits, lines, or interfaces to transfer data to or from the memory array 620. The memory controller 615 can include a memory manager 625 and an array controller 635.

The memory manager 625 can include, among other things, circuitry or firmware, such as a number of components or integrated circuits associated with various memory management functions. Some implementations are described herein in the context of NAND memory. Other forms of non-volatile memory may have analogous memory operations or management functions. Such NAND management functions include wear leveling (e.g., garbage collection or reclamation), error detection or correction, block retirement, or one or more other memory management functions. The memory manager 625 can parse or format host commands (e.g., commands received from a host) into device commands (e.g., commands associated with operation of a memory array), or generate device commands (e.g., to accomplish various memory management functions) for the array controller 635 or one or more other components of the memory device 610.

The memory manager 625 (shown as "Mem. Mgr." 625) can include a set of management tables 630 configured to maintain various information associated with one or more component of the memory device 610 (e.g., various information associated with a memory array or one or more memory cells coupled to the memory controller 615). For example, the management tables 630 can include information regarding block age, block erase count, error history, or one or more error counts (e.g., a write operation error count, a read bit error count, a read operation error count, an erase error count, etc.) for one or more blocks of memory cells coupled to the memory controller 615. In certain examples, if the number of detected errors for one or more of the error counts is above a threshold, the bit error can be referred to as an uncorrectable bit error. The management tables 630 can maintain a count of correctable or uncorrectable bit errors, among other things.

The array controller 635 can include, among other things, circuitry or components configured to control memory operations associated with writing data to, reading data from, or erasing one or more memory cells of the memory device 610 coupled to the memory controller 615. The memory operations can be based on, for example, host commands received from the host device 605, or internally generated by the memory manager 625 (e.g., in association with wear leveling, error detection, and/or error correction).

The array controller 635 can include an error correction code (ECC) component 640, which can include, among other things, an ECC engine or other circuitry configured to detect or correct errors associated with writing data to or reading data from one or more memory cells of the memory device 610 coupled to the memory controller 615. The memory controller 615 can be configured to actively detect and recover from error occurrences (e.g., bit errors or operation errors) associated with various operations or storage of data, while maintaining integrity of the data transferred between the host device 605 and the memory device 610, or maintaining integrity of stored data (e.g., using redundant RAID storage), and can remove (e.g., retire) failing memory resources (e.g., memory cells, memory arrays, pages, blocks, etc.) to prevent future errors.

The memory array 620 can include several memory cells arranged in, for example, a number of devices, planes, sub-blocks, blocks, or pages. As one example, a 48 gigabyte (GB) triple-level cell (TLC) NAND memory device can include 18,592 bytes (B) of data per page (16,384+2208 bytes), 1536 pages per block, 548 blocks per plane, and 4 or more planes per device. As another example, a 32 GB multi-level cell (MLC) memory device (storing two bits of data per cell (4 programmable states)) can include 18,592 bytes (B) of data per page (16,384+2208 bytes), 1024 pages per block, 548 blocks per plane, and 4 planes per device, but with half the write time and twice the program/erase (P/E) cycles as a corresponding TLC memory device. Other examples can include other numbers or arrangements. In some examples, a memory device, or a portion thereof, may be selectively operated in single-level cell (SLC) mode, or in a desired MLC mode (e.g., TLC or quad-level cell (QLC), among other examples).

In operation, data can be written to or read from the NAND memory device 610 in pages, and erased in blocks. However, one or more memory operations (e.g., read, write, or erase,) can be performed on larger or smaller groups of memory cells, as desired. The data transfer size of a NAND memory device 610 can be referred to as a page, whereas the data transfer size of a host is typically referred to as a sector.

Although a page of data can include a number of bytes of user data (e.g., a data payload including a number of sectors of data) and its corresponding metadata, the size of the page can refer only to the number of bytes used to store the user data. As an example, a page of data having a page size of 4 kilobytes (KB) may include 4 KB of user data (e.g., 8 sectors with a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 620 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding SLC NAND flash device. As such, the MLC device may include more metadata bytes for error data than the corresponding SLC device. One or more devices or components shown in FIG. 6 may be used to carry out operations described elsewhere herein, such as the operations of FIGS. 1A-1M, the operations of FIGS. 2A-2C, and/or the methods of FIGS. 3-5.

As indicated above, FIG. 6 is provided as an example. Other examples may differ from what is described with regard to FIG. 6.

Figure 7:
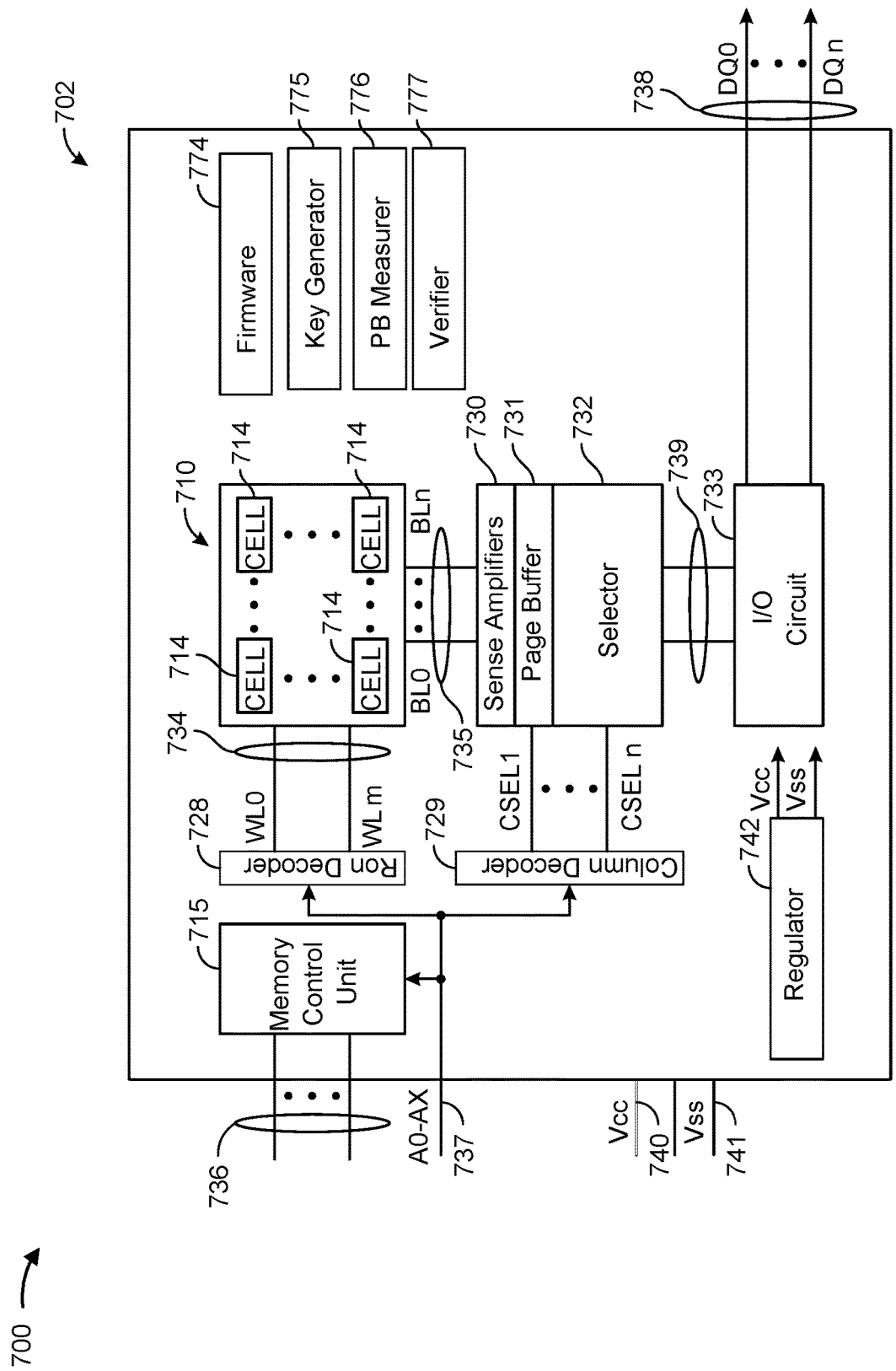
FIG. 7 is a diagram illustrating an example NAND device including a page buffer.

FIG. 7 is a diagram of an example 700 of a NAND device including a page buffer. As shown in FIG. 7, example 700 includes a memory device 702 with a memory array 710 having a plurality of memory cells 714, and one or more circuits or components to provide communication with, or perform one or more memory operations on, the memory array 710. The memory device 702 may include a row decoder 728, a column decoder 729, sense amplifiers 730, a page buffer 731, a selector 732, an input/output (I/O) circuit 733, and a memory control unit 715. The memory cells 714 of the memory array 710 can be arranged in rows, columns, pages, and blocks, and can be accessed using, for example, access lines 734, data lines 735, and/or or one or more select gates.

The memory control unit 715 (which may correspond to controller 142) can control memory operations of the memory device 702 according to one or more signals or instructions received on control lines 736, including, for example, one or more clock signals or control signals that indicate a desired operation (e.g., write, read, or erase), or address signals (A0-AX) received on an address line 737. One or more devices external to the memory device 702 can control the values of the control signals on the control lines 736 or the address signals on the address line 737. Examples of devices external to (or that may include) the memory device 702 may include a host, a memory controller, a processor, a computing device, or one or more circuits or components described herein.

The memory device 702 may use access lines 734 and data lines 735 to transfer data to (e.g., write or erase) or from (e.g., read) one or more of the memory cells 714. The row decoder 728 and the column decoder 729 can receive and decode the address signals (A0-AX) from the address line 737, can determine which of the memory cells 714 are to be accessed, and can provide signals to one or more of the access lines 734 (e.g., one or more of a plurality of word lines (WL0-WLm)) or the data lines 735 (e.g., one or more of a plurality of bit lines (BL0-BLn)), such as described above.

The memory device 702 can include sense circuitry, such as the sense amplifiers 730, configured to determine the values of data on (e.g., read), or to determine the values of data to be written to, the memory cells 714 using the data lines 735. For example, in a selected string of memory cells, one or more of the sense amplifiers 730 can read a logic level in the selected memory cell in response to a read current flowing in the memory array through the selected string to the data lines 735.

One or more devices external to the memory device 702 can communicate with the memory device 702 using the I/O lines (DQ0-DQN) 738, address lines 737 (A0-AX), or control lines 736. The input/output (I/O) circuit 733 can transfer values of data in or out of the memory device 702, such as in or out of the page buffer 731 or the memory array 710, using the I/O lines 738, according to, for example, the control lines 736 and address lines 737. The page buffer 731 can store data received from the one or more devices external to the memory device 702 before the data is programmed into relevant portions of the memory array 710, or can store data read from the memory array 710 before the data is transmitted to the one or more devices external to the memory device 702.

The column decoder 729 can receive and decode address signals (A0-AX) into one or more column address signals (CSEL1-CSELn). The selector 732 (e.g., a select circuit) can receive the column select signals and select data in the page buffer 731 representing values of data to be read from or to be programmed into memory cells 714. Selected data can be transferred between the page buffer 731 and the I/O circuit 733 using data lines 739.

The memory control unit 715 can receive positive and negative supply signals, such as a supply voltage (Vcc) 740 and a negative supply (Vss) 741 (e.g., a ground potential), from an external source or supply (e.g., an internal or external battery, an AC-to-DC converter, etc.). In certain examples, the memory control unit 715 can include a regulator 742 to internally provide positive or negative supply signals.

The memory management of the memory device 702 may include firmware 774 (or software or hardware) used to implement security operations for page buffer 731. For example, memory device 702 may include a key generator 775, a page buffer measurer 776, or a verifier 777, among other examples. Key generator 775 may include a component providing means for generating a security key using, for example, a set of initialized values from a page buffer physical unclonable function. Page buffer measurer 776 may include a component providing means for measuring a page buffer to obtain initialized values as output from the page buffer 731. Verifier 777 may include a component providing means for verifying a security state of page buffer 731 and/or another component associated therewith using a security key, signature, or entropy source generated using the page buffer physical unclonable function. One or more devices or components shown in FIG. 7 may be used to carry out operations described elsewhere herein, such as the operations of FIGS. 1A-1M, the operations of FIGS. 2A-2C, and/or the methods of FIGS. 3-5.

As indicated above, FIG. 7 is provided as an example. Other examples may differ from what is described with regard to FIG. 7.

Figure 8:
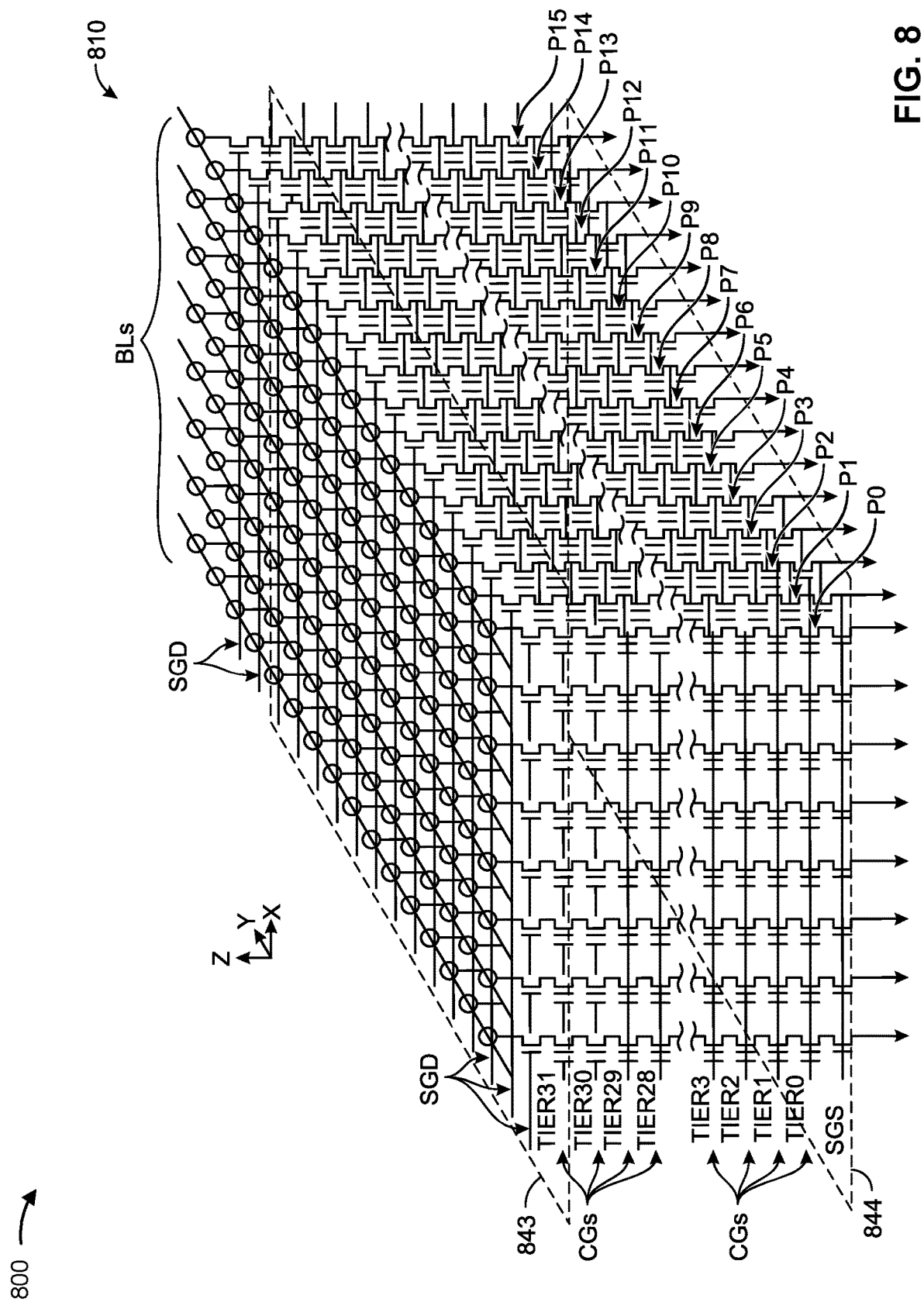
FIG. 8 is a diagram illustrating an example memory array.

FIG. 8 is a diagram of an example 800 of a memory array. As shown in FIG. 8, example 800 includes a 3D NAND architecture semiconductor memory array 810 including a plurality of strings of memory cells, each string including 32 tiers (TIER0-TIER31) of charge storage transistors stacked in the Z direction, source to drain, from a source-side select gate (SGS) to a drain-side select gate (SGD). Each string of memory cells in the 3D memory array can be arranged along the Y direction as data lines (e.g., bit lines (BL)), and along the X direction as physical pages (P0-P15). Within a physical page (e.g., P0), each tier represents a row of memory cells, and each string of memory cells represents a column. A block of memory cells can include a number of physical pages (e.g., 128, 384, etc.). In other examples, each string of memory cells can include more tiers or fewer tiers (e.g., 8, 16, 64, or 128), as well as one or more additional tiers of semiconductor material above or below the charge storage transistors (e.g., select gates or data lines).

Each memory cell in the memory array 810 includes a control gate coupled to (e.g., electrically or otherwise operatively connected to) an access line (e.g., word line), which collectively couples the control gates across a specific tier, or a portion of a tier, as desired. Specific tiers in the 3D memory array, and accordingly, specific memory cells in a string, can be accessed or controlled using respective access lines. For example, the memory array 810 includes a first level of semiconductor material 843 (e.g., polysilicon, etc.) that couples the control gates of each memory cell in TIER31, and a second level of semiconductor material 844 that couples the source-side select gates (SGS) of the array. Similar levels of metal or semiconductor material can couple the control gates for each tier. Specific strings of memory cells in the array can be accessed, selected, or controlled using a combination of bit lines (BLs) and select gates, and specific memory cells at one or more tiers in the specific strings can be accessed, selected, or controlled using one or more access lines (e.g., word lines). In some implementations, NAND 140 may include the memory array 140 of FIG. 8.

As indicated above, FIG. 8 is provided as an example. Other examples may differ from what is described with regard to FIG. 8.

Figure 9:
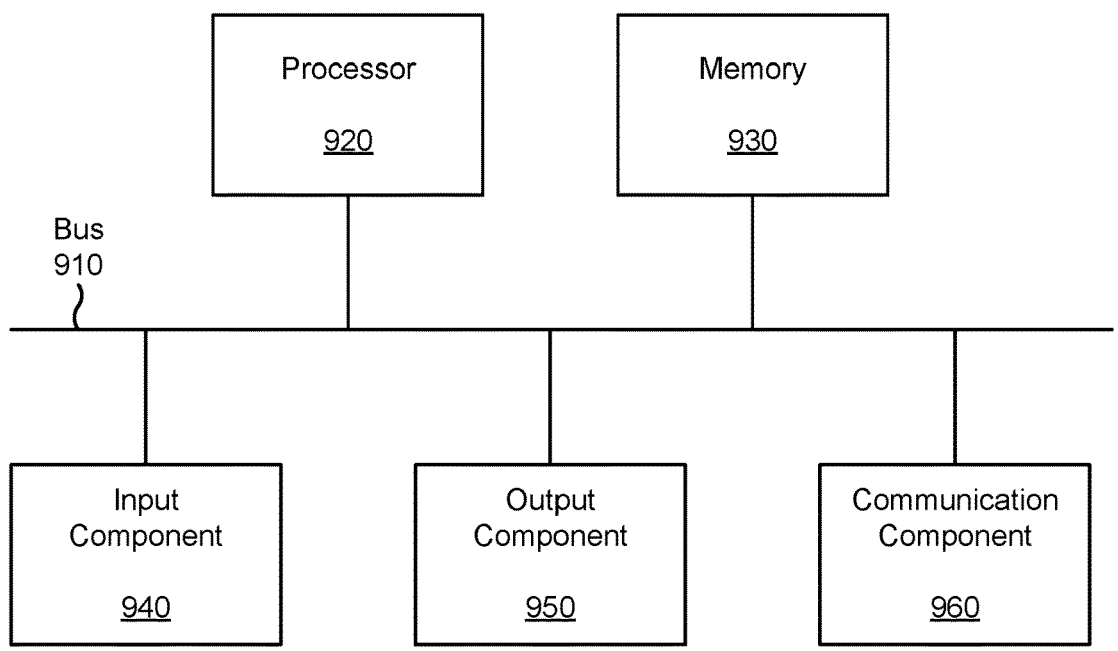
FIG. 9 is a diagram illustrating example components of a device.

FIG. 9 is a diagram of example components of a device 900, which may correspond to host 110, storage system 120, and/or verification system 190. In some implementations, host 110, storage system 120, and/or verification system 190 include one or more devices 900 and/or one or more components of device 900. As shown in FIG. 9, device 900 may include a bus 910, a processor 920, a memory 930, an input component 940, an output component 950, and a communication component 960.

Bus 910 includes one or more components that enable wired and/or wireless communication among the components of device 900. Bus 910 may couple together two or more components of FIG. 9, such as via operative coupling, communicative coupling, electronic coupling, and/or electric coupling. Processor 920 includes a central processing unit, a graphics processing unit, a microprocessor, a controller, a microcontroller, a digital signal processor, a field-programmable gate array, an application-specific integrated circuit, and/or another type of processing component. Processor 920 is implemented in hardware, firmware, or a combination of hardware and software. In some implementations, processor 920 includes one or more processors capable of being programmed to perform one or more operations or processes described elsewhere herein.

Memory 930 includes volatile and/or nonvolatile memory. For example, memory 930 may include random access memory (RAM), read only memory (ROM), a hard disk drive, and/or another type of memory (e.g., a flash memory, a magnetic memory, and/or an optical memory). Memory 930 may include internal memory (e.g., RAM, ROM, or a hard disk drive) and/or removable memory (e.g., removable via a universal serial bus connection). Memory 930 may be a non-transitory computer-readable medium. Memory 930 stores information, instructions, and/or software (e.g., one or more software applications) related to the operation of device 900. In some implementations, memory 930 includes one or more memories that are coupled to one or more processors (e.g., processor 920), such as via bus 910.

Input component 940 enables device 900 to receive input, such as user input and/or sensed input. For example, input component 940 may include a touch screen, a keyboard, a keypad, a mouse, a button, a microphone, a switch, a sensor, a global positioning system sensor, an accelerometer, a gyroscope, and/or an actuator. Output component 950 enables device 900 to provide output, such as via a display, a speaker, and/or a light-emitting diode. Communication component 960 enables device 900 to communicate with other devices via a wired connection and/or a wireless connection. For example, communication component 960 may include a receiver, a transmitter, a transceiver, a modem, a network interface card, and/or an antenna.

Device 900 may perform one or more operations or processes described herein. For example, a non-transitory computer-readable medium (e.g., memory 930) may store a set of instructions (e.g., one or more instructions or code) for execution by processor 920. Processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry is used instead of or in combination with the instructions to perform one or more operations or processes described herein. Additionally, or alternatively, processor 920 may be configured to perform one or more operations or processes described herein. Thus, implementations described herein are not limited to any specific combination of hardware circuitry and software.

The number and arrangement of components shown in FIG. 9 are provided as an example. Device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

In some implementations, a method includes resolving a set of latches of a NAND page buffer to a set of initialized values; obtaining a NAND page buffer initialized data set from the set of initialized values of the set of latches; and generating a security key using the NAND page buffer initialized data set.

In some implementations, a device includes a NAND page buffer, comprising: a set of static random access memory (SRAM) latches, wherein an SRAM latch, of the set of SRAM latches, includes a first enable control associated with a first inverter and a second enable control associated with a second inverter; and a controller configured to: control the set of SRAM latches to cause the set of SRAM latches to resolve to a set of initialized values; obtain the set of initialized values from the set of SRAM latches; and output the set of initialized values.

In some implementations, an apparatus includes means for initializing a set of data caches of a latch of a data node of a NAND page buffer; means for resolving the latch of the data node of the NAND page buffer to an initialized value; and means for obtaining a NAND page buffer initialized data set comprising a set of initialized values for a set of data nodes of the NAND page buffer, wherein the set of initialized values includes the initialized value.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
resolving a set of latches of a NAND page buffer to a set of initialized values, wherein resolving the set of latches to the set of initialized values is based on:
enabling set voltage sources and reset voltage sources of data nodes associated with the set of latches; and
disabling the set voltage sources and the reset voltage sources;
obtaining a NAND page buffer initialized data set from the set of initialized values of the set of latches; and
generating a security key using the NAND page buffer initialized data set.

2. The method of claim 1, further comprising:
setting a data node, of the data nodes, to a ground voltage;
setting a set of sense nodes of the data node to a control voltage;
initializing a first data cache and a second data cache of the data node to ground voltage based on enabling a set voltage source of the data node and a reset voltage source of the data node; and
enabling the set of sense nodes, wherein the latch of the data node is resolved to an initialized value, of the set of initialized values, based on disabling the set voltage source and the reset voltage source and enabling the set of sense nodes.

3. The method of claim 1, further comprising:
initializing a set of data caches of a data node, of the data nodes, to an initialized voltage state; and
resolving the latch of the data node to an initialized value, of the set of initialized values, after initializing the set of data caches of the data node.

4. The method of claim 1, wherein a latch, of the set of latches, is associated with a corresponding group of initialized values of the NAND page buffer initialized data set, and
wherein a quantity of initialized values in the corresponding group of initialized values is based on a width of the NAND page buffer.

5. The method of claim 1, further comprising:
using the NAND page buffer for a set of memory operations after obtaining the NAND page buffer initialized data set.

6. The method of claim 5, further comprising:
performing, after obtaining the NAND page buffer initialized data set, at least one of a write operation, a read operation, or an overwrite operation on a set of data nodes, which include the set of latches, of the NAND page buffer.

7. The method of claim 1, further comprising:
applying an error correction algorithm to the NAND page buffer initialized data set to generate a corrected NAND page buffer initialized data set; and
generating the security key using the corrected NAND page buffer initialized data set.

8. The method of claim 1, further comprising:
selecting one or more subsets of a set of helper data associated with error correction of the NAND page buffer initialized data set; and
generating, using the one or more subsets of the set of helper data, one or more security keys corresponding to the one or more subsets of the set of helper data.

9. The method of claim 1, wherein a rate of errors in the NAND page buffer initialized data set is less than 10%.

10. The method of claim 1, wherein a size of the NAND page buffer initialized data set is based on a quantity of latches in the NAND page buffer.

11. The method of claim 1, further comprising:
measuring a set of voltages of the set of latches to identify the set of initialized values.

12. The method of claim 1, wherein the set of latches is a set of static random access memory (SRAM) latches.

13. The method of claim 1, further comprising:
verifying a security state associated with the NAND page buffer using the security key.

14. The method of claim 1, further comprising:
generating the security key using a hash-based message authentication code (HMAC) algorithm.

15. The method of claim 1, further comprising:
resolving the set of latches in connection with a power on of a power cycle of the NAND page buffer; and
maintaining the security key for a duration of the power cycle of the NAND page buffer.

16. The method of claim 1, further comprising:
resetting the set of latches during a power cycle of the NAND page buffer; and
resolving the set of latches based on resetting the set of latches.

17. The method of claim 16, further comprising:
resetting the set of latches without power cycling the NAND page buffer.

18. The method of claim 1, further comprising:
transmitting a set command or a reset command to reset the set of latches; and
transmitting a resolve command to resolve the set of latches after transmitting the set command or the reset command.

19. The method of claim 1, further comprising:
transmitting a set of commands to the NAND page buffer to cause the NAND page buffer to generate the security key.

20. The method of claim 1, further comprising:
maintaining the security key while the NAND page buffer is powered on; and
releasing the security key in connection with the NAND page buffer being powered off.

21. A device, comprising:
a NAND page buffer, comprising:
a set of static random access memory (SRAM) latches, wherein an SRAM latch, of the set of SRAM latches, includes a first enable control associated with a first inverter and a second enable control associated with a second inverter; and
a controller configured to:
control the set of SRAM latches to cause the set of SRAM latches to resolve to a set of initialized values based on enabling set voltage sources and reset voltage sources concurrently for each latch of the set of latches;
obtain the set of initialized values from the set of SRAM latches; and
output the set of initialized values.

22. The device of claim 21, wherein the controller is configured to control the set of SRAM latches to cause the set of SRAM latches to resolve to the set of initialized values during a power cycle.

23. The device of claim 21, wherein the controller is configured to:

initialize the first enable control and the second enable control of the SRAM latch to cause the SRAM latch to resolve to an initialized value of the set of initialized values; and obtain the initialized value from the SRAM latch.

24. The device of claim 21, wherein a first SRAM latch, of the set of SRAM latches, differs from one or more second SRAM latches, of the set of SRAM latches, with respect to one or more process parameters; and wherein the set of initialized values are probabilistically based on the one or more process parameters.

25. An apparatus, comprising:

means for initializing a set of data caches of a latch of a data node of a NAND page buffer;

means for resolving the latch of the data node of the NAND page buffer to an initialized value based on:
  enabling a set voltage source and a reset voltage source of the data node; and
  disabling the set voltage source and the reset voltage source; and means for obtaining a NAND page buffer initialized data set comprising a set of initialized values for a set of data nodes of the NAND page buffer, wherein the set of initialized values includes the initialized value.

26. The apparatus of claim 25, further comprises:

means for seeding an algorithm based at least in part on the set of initialized values.

27. The apparatus of claim 26, wherein the algorithm is at least one of: a random number generation algorithm, a security key generation algorithm, or a hashing algorithm.

28. The apparatus of claim 25, further comprising:

means for combining the initialized value with one or more other initialized values to generate a composite initialized value.

29. The apparatus of claim 28, further comprising:

means for XORing the initialized value with the one or more other initialized values to generate the composite initialized value.

30. The apparatus of claim 25, further comprising:

means for generating a digest based on the NAND page buffer initialized data set; and means for generating a device server root key based on the digest.

* * * * *